United States Patent [19]

Numao et al.

[11] Patent Number: 5,391,660
[45] Date of Patent: Feb. 21, 1995

[54] PROCESS FOR PREPARING POLYOLEFINES

[75] Inventors: Yosuke Numao; Yoshio Tajima, both of Yokohama, Japan

[73] Assignee: Nippon Oil Company, Limited, Tokyo, Japan

[21] Appl. No.: 3,405

[22] Filed: Jan. 12, 1993

[30] Foreign Application Priority Data

Jan. 14, 1992 [JP] Japan .................................. 4-040046
Jan. 14, 1992 [JP] Japan .................................. 4-040047

[51] Int. Cl.$^6$ .............................................. C08F 4/64
[52] U.S. Cl. ........................................ 526/128; 526/152; 526/153; 526/348.4; 526/348.5; 526/351; 526/352; 502/110
[58] Field of Search ................ 526/152, 127, 128, 153

[56] References Cited

U.S. PATENT DOCUMENTS 3,334,079  8/1967  Raich .................................. 526/152
4,871,704  10/1989  Kohara et al. ........................ 502/114

FOREIGN PATENT DOCUMENTS 58-19309A  2/1983  Japan .
130604  7/1985  Japan .
260602  12/1985  Japan .

OTHER PUBLICATIONS

Certified English Translation copies of JP 130604 and JP 260602.

Primary Examiner—Joseph L. Schofer
Assistant Examiner—David Wu
Attorney, Agent, or Firm—Dilworth & Barrese

[57] ABSTRACT

Polyolefins having a high molecular weight, an appropriate molecular weight distribution and a relatively narrow composition distribution are prepared in high activity.

The polymerization of an olefin or olefins is performed in the presence of a catalyst comprising a catalyst component and a modified organoaluminum compound, the catalyst component being prepared by mutually contacting (1) a compound of the general formula $Me^1R^1{}_nX^1{}_{4-n}$ and (2) an alkali metal salt of cyclopentadiene or indene and optionally (3) a compound of the general formula $Me^2R^2{}_mX^2{}_{3-m}$, and the modified organoaluminum compound and water and containing Al—O—Al bond(s).

11 Claims, No Drawings

PROCESS FOR PREPARING POLYOLEFINES

BACKGROUND OF THE INVENTION

The present invention relates to a process for preparing polyolefins using a specific catalyst. Particularly, the present invention is concerned with a process for preparing polyolefins, capable of preparing the polyolefins in a high polymerization activity by homo- or copolymerization of olefins in the presence of a specific catalyst, and capable of freely controlling the molecular weight distribution of the polyolefins obtained, the polyolefins having superior characteristics, for example a narrow composition distribution particularly in the case of copolymerization of ethylene and α-olefin.

Using zirconium compounds (typically metallocene compounds) in the preparation of polyolefins, especially homopolymers of ethylene or copolymers of ethylene and α-olefin, is known as disclosed in Japanese Patent Laid Open No. 19309/1983. However, although the process using such solid catalyst components can afford ethylene copolymers in high yield, the copolymers obtained are narrow in molecular weight distribution, also narrow in composition distribution, and low in molecular weight.

The molecular weight of resulting polymer can be increased to some extent by selecting a suitable transition metal compound of metallocene which is one component of the catalyst used. For example, in Japanese Patent Laid Open No. 234005/1988 it is proposed to use a transition metal compound having 2, 3 and 4-substituted cyclopentadienyl for increasing the molecular weight of the resulting polymer. Further, in Japanese Patent Laid Open No. 22307/1990 it is proposed to use a hafnium compound having a ligand bonded to at least two crosslinked conjugated cycloalkadienyl groups for increasing the molecular weight of the resulting polymer.

However, the preparation of such proposed catalyst components is complicated in both synthesis route and operation, and the use of hafnium as a transition metal is disadvantageous in that the yield of the resulting polymer is low.

It is the object of the present invention to overcome the abovementioned drawbacks, particularly provide a polyolefin preparing process which permits simplifying the preparation of catalyst components, permits easy control of the molecular weight distribution and can afford a easily polyolefin having a narrow composition distribution and high molecular weight in high yield.

SUMMARY OF THE INVENTION

The present invention-resides in a process for preparing a polyolefin, characterized by polymerizing at least one olefin in the presence of a catalyst comprising the following components a) and b):
a) a catalyst component obtained by contacting the following components (1) and (2) with each other:
  (1) a compound represented by the general formula $Me^1R^1{}_nX^1{}_{4-n}$ wherein $R^1$ is a hydrocarbon residue having 1 to 24 carbon atoms, $X^1$ is a halogen atom, Me is Zr, Ti or Hf, and n is $0 \leq n \leq 4$, and
  (2) an alkali metal salt of a member selected from cyclopentadienes and indenes; and
b) a modified organoaluminum compound prepared by the reaction of an organoaluminum compound and water and containing Al—O—Al bond(s).

The present invention also resides in a process for preparing a polyolefin, characterized by polymerizing at least one olefin in the presence of a catalyst comprising the following components a) and b):
a) a catalyst component obtained by contacting the following components (1), (2) and (3) with one another:
  (1) a compound represented by the general formula $Me^1R^1{}_nX^1{}_{4-n}$ wherein $R^1$ is a hydrocarbon residue having 1 to 24 carbon atoms, $X^1$ is a halogen atom, Me is Zr, Ti or Hf, and n is $0 \leq n \leq 4$,
  (2) an alkali metal salt of a member selected from cyclopentadienes and indenes; and
  (3) a compound represented by the general formula $Me^2R^2{}_nX^2{}_{z-m}$ wherein $R^2$ is a hydrocarbon group having 1 to 24 carbon atoms, $X^2$ is a alkoxy group having 1 to 12 carbon atoms of a halogen atom, $Me^2$ is a Group I–III element in the Periodic Table, z is the valence of $Me^2$, and m is $0 \leq m \leq 3$; and
b) a modified organoaluminum compound prepared by the reaction of an organoaluminum compound and water and containing Al—O—Al bond(s).

The catalyst used in the process of the present invention is high in activity per transition metal. Besides, the polyolefins obtained by the process of the present invention can be controlled their molecular weight distribution freely. Particularly, ethylene/α-olefin copolymers prepared according to the invention have excellent characteristics; for example, they are narrow in composition distribution and have little surface stickiness. This effect is outstanding especially when a compound represented by the general formula $Me^2R^2{}_mX^2{}_{z-m}$ is used as one of catalyst components.

DETAILED DESCRIPTION OF THE INVENTION

The present invention will be described in detail hereinunder.

According to the present invention, as mentioned above, there is provided a process for preparing a polyolefin, characterized by homo- or copolymerizing an olefin or olefins in the presence of a catalyst, the catalyst comprising a component obtained by contacting (1) a compound of the general formula $Me^1R^1{}_nX^1{}_{4-n}$, (2) an alkali metal salt of cyclopentadiene or indene, and optionally (3) a compound of the general formula $Me^2R^2{}_mX^2{}_{z-m}$, with one another, and a modified organoaluminum compound prepared by the reaction of an organoaluminum compound and water and containing Al—O—Al bond(s). Reference will first be made to the compound of the general formula $Me^1R^1{}_nX^1{}_{4-n}$. In this formula, $R^1$ is a hydrocarbon residne having 1 to 24, preferably 1 to 12, more preferably 1 to 8, carbon atoms. As examples of such hydrocarbon residue, which is a hydrocarbon group or $OR^1$ ($R^1$ is a hydrocarbon group) unit there are mentioned alkyl group s such as methyl, ethyl, propyl, butyl, pentyl, hexyl and octyl; alkenyl groups such as vinyl and allyl; aryl groups such as phenyl, tolyl and xylyl; aralkyl groups such as benzyl, phenethyl, styryl and neophyl; alkoxy groups such as methoxy, ethoxy, propoxy, butoxy and pentyloxy; aryloxy groups such as phenoxy and tolyloxy; and aralkyloxy groups such as benzyloxy. $X^1$ is a halogen atom, which is fluorine, iodine, chlorine or bromine. $Me^1$ is Zr, Ti or Hf, with Zr being preferred. n is $0 \leq n \leq 4$, preferably $0 < n \leq 4$.

Examples of the compound represented by the above general formula include tetramethyl zirconium, tetraethyl zirconium, tetrapropyl zirconium, tetra-n-butyl zirconium, tetrapentyl zirconium, tetraphenyl zirconium, tetratolyl zirconium, tetrabenzyl zirconium, tetramethoxy zirconium, tetraethoxy zirconium, tetrapropoxy zirconium, tetrabutoxy zirconium, tetraphenoxy zirconium, tetratolyloxy zirconium, tetrapentyloxy zirconium, tetrabenzyloxy zirconium, tetraallyl zirconium, tetraneophyl zirconium, trimethylmonochloro zirconium, triethylmonochloro zirconium, tripropylmonochloro zirconium, tri-n-butylmonochloro zirconium, tribenzylmonochloro zirconium, dimethyldichloro zirconium, diethyldichloro zirconium, di-n-butyldichloro zirconium, dibenzyldichloro zirconium, monomethyltrichloro zirconium, monoethyltrichloro zirconium, mono-n-butyltrichloro zirconium, monobenzyltrichloro zirconium, tetrachloro zirconium, trimethoxymonochloro zirconium, dimethoxydichloro zirconium, monomethoxytrichloro zirconium, tetraethoxy zirconium, triethoxymonochloro zirconium, diethoxydichloro zirconium, monoethoxytrichloro zirconium, triisopropoxymonochloro zirconium, diisopropoxydichloro zirconium, monoisopropoxytrichloro zirconium, tetra-n-butoxy zirconium, tri-n-butoxymonochloro zirconium, di-n-butoxydichloro zirconium, mono-n-butoxytrichloro zirconium, tripentoxymonochloro zirconium, dipentoxydichloro zirconium, monopentoxytrichloro zirconium, triphenoxymonochloro zirconium, diphenoxydichloro zirconium, monophenoxytrichloro zirconium, tritolyloxymonochloro zirconium, ditolyloxydichloro zirconium, monotolyloxytrichloro zirconium, tribenzyloxymonochloro zirconium, dibenzyloxydichloro zirconium, monobenzyloxytrichloro zirconium, trimethylmonobromo zirconium, triethylmonobromo zirconium, tripropylmonobromo zirconium, tri-n-butylmonobromo zirconium, tribenzylmonobromo zirconium, dimethyldibromo zirconium, diethyldibromo zirconium, di-n-butyldibromo zirconium, dibenzyldibromo zirconium, monomethyltribromo zirconium, monoethyltribromo zirconium, mono-n-butyltribromo zirconium, monobenzyltribromo zirconium, tetrabromo zirconium, trimethoxymonobromo zirconium, dimethoxydibromo zirconium, monomethoxytribromo zirconium, triethoxymonobromo zirconium, diethoxydibromo zirconium, monoethoxytribromo zirconium, triisopropoxymonobromo zirconium, diisopropoxydibromo zirconium, monoisopropoxytribromo zirconium, tri-n-butoxymonobromo zirconium, di-n-butoxydibromo zirconium, mono-n-butoxytribromo zirconium, tripentoxymonobromo zirconium, dipentoxydibromo zirconium, monopentoxytribromo zirconium, triphenoxymonobromo zirconium, diphenoxydibromo zirconium, monophenoxytribromo zirconium, tritolyloxymonobromo zirconium, ditolyloxydibromo zirconium, monotolyloxytribromo zirconium, tribenzyloxymonobromo zirconium, dibenzyloxydibromo zirconium, monobenzyloxytribromo zirconium, trimethylmonoiodo zirconium, triethylmonoiodo zirconium, tripropylmonoiodo zirconium, tri-n-butylmonoiodo zirconium, tribenzylmonoiodo zirconium, dimethyldiiodo zirconium, diethyldiiodo zirconium, di-n-bnutyldiiodo zirconium, dibenzyldiiodo zirconium, monomethyltriiodo zirconium, monoethyltriiodo zirconium, mono-n-butyltriiodo zirconium, monobenzyltriiodo zirconium, tetraiodo zirconium, trimethoxymonoiodo zirconium, dimethoxymonoiodo zirconium, monomethoxytriiodo zirconium, triethoxydiiodo zirconium, diethoxydiiodo zirconium, monoethoxytriiodo zirconium, triisopropoxymonoiodo zirconium, diisopropoxydiiodo zirconium, monoisopropoxytriiodo zirconium, tri-n-butoxymonoiodo zirconium, di-n-butoxydiiodo zironium, mono-n-butoxytriiodo zirconium, tripentoxymonoiodo zironium, dipentoxydiiodo zirconium, monopentoxytriiodo zirconium, triphenoxymonoiodo zirconium, diphenoxydiiodo zirconium, monophenoxytriiodo zirconium, tritolyloxymonoiodo zirconium, ditolyloxydiiodo zirconium, monotolyloxytriiodo zirconium, tribenzytoxymonoiodo zirconium, dibenzyloxydiiodo zirconium, monobenzyloxytriiodo zirconium, tetramethyl titanium, tetraethyl titanium, tetrapropyl titanium, tetra-n-butyl titanium, tetrapentyl titanium, tetraphenyl titanium, tetratolyl titanium, tetrabenzyl titanium, tetramethoxy titanium, tetraethoxy titanium, tetrapropoxy titanium, tetrabutoxy titanium, tetraphenoxy titanium, tetratolyloxy titanium, tetrapentyloxy titanium, tetrabenzyloxy titanium, tetraallyl titanium, tetraneophyl titanium, trimethylmonochloro titanium, triethylmonochloro titanium, tripropylmonochloro titanium, tri-n-butylmonochloro titanium, tribenzylmonochloro titanium, dimethyldichloro titanium, diethyldichloro titanium, di-n-butyldichloro titanium, dibenzyldichloro titanium, monomethyltrichloro titanium, monoethyltrichloro titanium, mono-n-butyltrichloro titanium, monobenzyltrichloro titanium, tetrachloro titanium, trimethoxymonochloro titanium, dimethoxydichloro titanium, monomethoxytrichloro titanium, tetraethoxy titanium, triethoxymonochloro titanium, diethoxydichloro titanium, monoethoxytrichloro titanium, triisopropoxymonochloro titanium, diisopropozydichloro titanium, monoisopropoxytrichloro titanium, tetra-n-butoxy titanium, tri-n-butoxymonochloro titanium, di-n-butoxydichloro titanium, mono-n-butoxytrichloro titanium, tripentoxymonochloro titanium, dipentoxydichloro titanium, monopentoxytrichloro titanium, triphenoxymonochloro titanium, diphenoxydichloro titanium, monophenoxytrichloro titanium, tritolyloxy monochloro titanium, ditolyloxydichloro titanium, monotolyloxytrichloro titanium, tribenzyloxymonochloro titanium, dibenzyloxydichloro titanium, monobenzyloxytrichloro titanium, triethylmonobromo titanium, tripropylmonobromo titanium, tri-n-butylmonobromo titanium, tribenzylmonobromo titanium, dimethyldibromo titanium, diethyldibromo titanium, di-n-butyldibromo titanium, dibenzyldibromo titanium, monomethyltribromo titanium, monoethyltribromo titanium, mono-n-butyltribromo titanium, monobenzyltribromo titanium, tetrabromo titanium, trimethoxymonobromo titanium, dimethoxydibromo titanium, monomethoxytribromo titanium, triethoxymonobromo titanium, diethoxydibromo titanium, monoethoxytribromo titanium, triisopropoxymonobromo titanium, diisopropoxydibromo titanium, monoisopropoxytribromo titanium, tri-n-butoxymonobromo titanium, di-n-butoxydibromo titanium, mono-n-butoxytribromo titanium, tripentoxymonobromo, titanium, dipentoxydibromo titanium, monopentoxytribromo titanium, triphenoxymonobromo titanium, diphenoxydibromo titanium, monophenoxytribromo titanium, tritolyloxymonobromo titanium, ditolyloxydibromo titanium, monotolyloxytribromo titanium, tribenzyloxymonobromo titanium, dibenzyloxydibromo titanium, monobenzyloxytribromo titanium, trimethylmonoiodo titanium, triethylmonoiodo titanium, tripropylmonoiodo titanium, tri-n-butylmonoiodo titanium, tribenzylmonoiodo titanium, dimethyldiiodo titanium, diethyldiiodo titanium, di-n-butyldiiodo titanium, dibenzyldiiodo titanium, monomethyltriiodo titanium, monoethyltriiodo titanium, mono-n-butyltriiodo titanium, monobenzyltriiodo titanium, tetraiodo titanium, trimethoxymonoiodo titanium, dimethoxydiiodo titanium, monomethoxytriiodo titanium, triethoxymonoiodo titanium, diethoxydiiodo titanium, monoethoxytriiodo titanium, triisopropoxymonoiodo titanium, diisopropoxydiiodo titanium, monoisoproposytriiodo titanium, tri-n-butoxymonoiodo titanium, di-n-butoxydiiodo titanium, mono-n-butoxytriiodo titanium, tripentoxymonoiodo titanium, dipentoxydiiodo titanium, monopentoxytriiodo titanium, triphenoxymonoiodo titanium, diphenoxydiiodo titanium, monophenoxytriiodo titanium, tritolyloxymonoiodo titanium, ditolyloxydiiodo titanium, monotolyloxytriiodo titanium, tribenzyloxymonoiodo titanium, dibenzyloxydiiodo titanium, monobenzyloxytriiodo titanium, tetramethyl hafnium, tetraethyl hafnium, tetrapropyl hafnium, tetra-n-butyl hafnium, tetrapentyl hafnium, tetraphenyl hafnium, tetratolyl hafnium, tetrabenzyl hafnium, tetramethoxy hafnium, tetraethoxy hafnium, tetrapropoxy hafnium, tetrabutoxy hafnium, tetraphenoxy hafnium, tetratolyloxy hafnium, tetrapentyloxy hafnium, tetrabenzyloxy hafnium, tetraallyl hafnium, tetraneophyl hafnium, trimethylmonochloro hafnium, triethylmonochloro hafnium, tripropylmonochloro hafnium, tri-n-butylmonochloro hafnium, tribenzylmonochloro hafnium, dimethyldichloro hafnium, diethyldichloro hafnium, di-n-butyldichloro hafnium, dibenzyldichloro hafnium, monomethyltrichloro hafnium, monoethyltrichloro hafnium, mono-n-butyltrichloro hafnium, monobenzyltrichloro hafnium, tetrachloro hafnium, trimethoxymonochloro hafnium, dimethoxydichloro hafnium, monomethoxytrichloro hafnium, tetraethoxy hafnium, triethoxymonochloro hafnium, diethoxydichloro hafnium, monoethoxytrichloro hafnium, triisopropoxymonochloro hafnium, diisopropoxydichloro hafnium, monoisopropoxytrichloro hafnium, tetra-n-butoxy hafnium, tri-n-butoxymonochloro hafnium, di-n-butoxydichloro hafnium, mono-n-butoxytrichloro hafnium, tripentoxymonochloro hafnium, dipentoxydichloro hafnimum, monopentoxytrichloro hafnium, triphenoxymonochloro hafnium, diphenoxydichloro hafnium, monophenoxytrichloro hafnium, tritolyloxymonochloro hafnium, ditolyloxydichloro hafnimum, monotolyloxytrichloro hafnium, tribenzyloxymonochloro hafnium, dibenzyloxydichloro hafnium, monobenzyloxytrichloro hafnium, trimethylmonobromo hafnium, trietylmonobromo hafnium, tripropylmonobromo hafnium, tri-n-butylmonobromo hafnium, tribenzylmonobromo hafnium, dimethyldibromo hafnium, diethyldibromo hafnium, di-n-butyldibromo hafnium, dibenzyldibromo hafnium, monomethyltribromo hafnium, monoethyltribromo hafnium, mono-n-butyltribromo hafnium, monobenzyltribromo hafnium, tetrabromo hafnium, trimethoxymonobromo hafnium, dimethoxydibromo hafnium, monomethoxytribromo hafnium, triethoxymonobromo hafnium, diethoxydibromo hafnium, monoethoxytribromo hafnium, triisopropoxymonobromo hafnium, diisopropoxydibromo hafnium, monoisopropoxytribromo hafnium, tri-n-butoxymonobromo hafnium, di-n-butoxydibromo hafnium, mono-n-butoxytribromo hafnium, tripentoxymonobromo hafnium, dipentoxydibromo hafnium, monopentoxytribromo hafnium, triphenoxymonobromo hafnium, diphenoxydibromo hafnium, monophenoxytribromo hafnium, tritolyloxymonobromo hafnium, ditolyloxydibromo hafnium, monotolyloxytribromo hafnium, tribenzyloxymonobromo hafnium, dibenzyloxydibromo hafnium, monobenzyloxytribromo hafnium, trimethylmonoiodo hafnium, triethylmonoiodo hafnium, tripropylmonoiodo hafnium, tri-n-butylmonoiodo hafnium, tribenzylmonoiodo hafnium, dimethyldiiodo hafnium, diethyldiiodo hafnium, di-n-butyldiiodo hafnium, dibenzyldiiodo hafnium, monomethyltriiodo hafnium, monoethyltriiodo hafnium, mono-n-butyltriiodo hafnium, monobenzyltriiodo hafnium, tetraiodo hafnium, trimethoxymonoiodo hafnium, dimethoxydiiodo hafnium, monomethoxytriiodo hafnium, triethoxymonoiodo hafnium, diethoxydiiodo hafnium, monoethoxytriiodo hafnium, triisopropoxymonoiodo hafnium, diisopropoxydiiodo hafnium, monoisopropoxytriiodo hafnium, tri-n-butyoxymonoiodo hafnium, di-n-butoxydiiodo hafnium, mono-n-butoxytriiodo hafnium, tripentoxymonoiodo hafnium, dipentoxydiiodo hafnium, monopentoxytriiodo hafnium, triphenoxymonoiodo hafnium, diphenoxydiiodo hafnium, monophenoxytriiodo hafnium, tritolyloxymonoiodo hafnium, ditolyloxydiiodo hafnium, monotolyloxytriiodo hafnium, tribenzyloxymonoiodo hafnium, dibenzyloxydiiodo hafnium, and monobenzyloxytriiodo hafnium.

Particularly, tetramethylzirconium, tetraethylzirconium, tetrabenzylzirconium, tetrapropoxyzirconium, tetrabutoxyzirconium and tetrachlorozirconium are preferred. More preferred are transition metal compounds having alkoxy groups such as tetrapropoxyzirconium and tetrabutoxyzirconium. These compounds may be used as a mixture of two or more. Especially, the use of tetraalkoxyzirconium compounds is advantageous in that the resulting polymer is superior in fluidity (N value is large) despite the molecular weight distribution thereof is narrow. Further, in comparison with the use of zirconocene titanocene compound as a catalyst constituent in the prior art, the rate of lowering in density is high even if the number of comonomer branches per 1,000 carbon atoms (1,000C) is small. For example, in preparing an ethylene/α-olefin copolymer wherein ethylene is predominant, by copolymerizing ethylene with the α-olefin, it is possible to obtain a low density copolymer even in a small comonomer quantity.

The following description is now provided about the compound of the general formula $Me^2R^2_mX^2_{z-m}$. In this formula, $R^2$ is a hydrocarbon group having 1 to 24, preferably 1 to 12, more preferably 1 to 8, carbon atoms. As examples of such hydrocarbon group there are mentioned alkyl groups such as methyl, ethyl, propyl, isopropyl, butyl, pentyl, hexyl, octyl, decyl and dodecyl; alkenyl groups such as vinyl and allyl; aryl groups such as phenyl, tolyl and xylyl; and aralkyl groups such as benzyl, phenethyl and styryl. $X^2$ is an alkoxy group having 1 to 12, preferably 1 to 6, carbon atoms, or a halogen atom which is fluorine, iodine, chlorine or bromine. As examples of such alkoxy group there are mentioned methoxy, ethoxy, propoxy and butoxy. $Me^2$ is a Group I to III element in the Periodic Table, examples of which include lithium, sodium, potassium, magnesium, calcium, zinc, boron and aluminum. z is the valence of $Me^2$, and m is $0 < m \leq 3$, preferably $0 < m < 3$, provided m satisfies the relation of $m \leq z$.

Examples of the compound represented by this general formula include methyl lithium, ethyl lithium, n-propyl lithium, methyl lithium, ethyl lithium, n-propyl lithium, isopropyl lithium, n-butyl lithium, t-butyl lithium, pentyl lithium, octyl lithium, phenyl lithium, benzyl lithium, dimethyl magnesium, diethyl magnesium, di-n-propyl magnesium, diisopropyl magnesium, di-n-butyl magnesium, di-t-butyl magnesium, dipentyl magnesium, dioctyl magnesium, diphenyl magnesium, dibenzyl magnesium, methyl magnesium chloride, ethyl magnesium chloride, isopropyl magnesium chloride, n-propyl magnesium.chloride, n-butyl magnesium chloride, t-butyl magnesium chloride, pentyl magnesium chloride, octyl magnesium chloride, phenyl magnesium chloride, benzyl magnesium.chloride, methyl magnesium bromide, methyl magnesium iodide, ethyl magnesium bromide, ethyl magnesium iodide, isopropyl magnesium bromide, isopropyl magnesium iodide, n-propyl magnesium bromide, n-propyl magnesium iodide, n-butyl magnesium bromide, n-butyl magnesium iodide, t-butyl magnesium bromide, t-butyl magnesium iodide, pentyl magnesium bromide, pentyl mangeslum iodide, octyl magnesium bromide, octyl magnesium iodide, phenyl magnesium bromide, phenyl magnesium iodide, dimethyl zinc, diethyl zinc, di-n-propyl zinc, di-isopropyl zinc, di-n-butyl zinc, di-t-butyl zinc, dipentyl zinc, dioctyl zinc, diphenyl zinc, dibenzyl zinc, trimethyl boron, triethyl boron, tri-n-propyl boron, triisopropyl boron, tri-n-butyl boron, tri-t-butyl boron, tripentyl boron, trioctyl boron, triphenyl boron, tribenzyl boron, trimethyl aluminum, triethyl aluminuium, diehtyl aluminum chloride, diethyl aluminum bromide, diethyl aluminum fluoxide, diethyl aluminum iodide, ethyl aluminum dichloride, ethyl aluminum dibromide, ethyl aluminum difluoride, ethyl aluminum diiodide, tripropyl aluminum, dipropyl aluminum chloride, dipropyl aluminum bromide, dipropyl aluminum fluoride, dipropyl aluminum iodide, propyl aluminum dichloride, propyl aluminum dibromide, propyl aluminum difluoride, propyl aluminum diiodide, triisopropyl aluminum, diisopropyl aluminum chloride, diisopropyl aluminum bromide, diisopropyl aluminum fluoride, diisopropyl aluminum iodide, ethyl aluminum sesquichloride, ethyl aluminum sesquibromide, propyl aluminum sesquichloride, propyl aluminum sesquibromide, n-butyl aluminum sesquichroride, n-butyl aluminum sesquibromide, isopropyl aluminum dichloride, isopropyl aluminum dibromide, isopropyl aluminum difluoride, isopropyl aluminum diiodide, tributyl aluminum, dibutyl aluminum chloride, dibutyl aluminum bromide, dibutyl aluminum fluoride, dibutyl aluminum iodide, butyl aluminum dichloride, butyl alminium dibromide, butyl aluminum difluoride, butyl aluminum diiodide, tri-sec-butyl aluminum, di-sec-butyl aluminum chloride, di-sec-butyl aluminum fluoride, di-sec-butyl aluminum bromide, di-sec-butyl aluminum iodide, sec-butyl aluminum dichloride, sec-butyl aluminum dibromide, sec-butyl aluminum difluoride, sec-butyl aluminum diiodide, tri-t-butyl aluminum, di-t-butyl aluminium chloride, di-t-butyl aluminum bromide, di-t-butyl aluminum fluoride, di-t-butyl aluminum iodide, t-butyl aluminum dichloride, t-butyl aluminum dibromide, t-butyl aluminum difluoride, t-butyl aluminum diiodide, triisobutyl aluminum, diisobutyl aluminum chloride, diisobutyl aluminum bromide, diisobutyl aluminum fluoride, diisobutyl aluminum iodide, isobutyl aluminum dichloride, isobutyl aluminum dibromide, isobutyl aluminum difluoride, isobutyl aluminum diiodide, trihexyl aluminum, dihexyl aluminum chloride, dihexyl aluminum bromide, dihexyl aluminum fluoride, dihexyl aluminum iodide, hexyl aluminum dichloride, hexyl aluminum dibromide, hexyl aluminum difluoride, hexyl aluminum diiodide, tripentyl aluminum, dipentyl aluminum chloride, dipentyl aluminum bromide, dipentyl aluminum fluoride, dipentyl aluminum iodide, pentyl aluminum dichloride, pentyl aluminum dibromide, pentyl aluminum difluoride, pentyl aluminum diiodide, methyl aluminum methoxide, methyl aluminum ethoxide, methyl aluminum propoxide, methyl aluminum butoxide, dimethyl aluminum methoxide, dimethyl aluminum ethoxide, dimethyl aluminum butoxide, ethyl aluminum methoxide, ethyl aluminum ethoxide, ethyl aluminum propoxide, ethyl aluminum butoxide, diethyl aluminum methoxide, diethyl aluminum ethoxide, diethyl aluminum propoxide, diethyl aluminum butoxide, propyl aluminum methoxide, propyl aluminum ethoxide, propyl aluminum propoxide, propyl aluminum butoxide, dipropyl aluminum methoxide, dipropyl aluminum ethoxide, dipropyl aluminum propoxide, dipropyl aluminum butoxide, butyl aluminum methoxide, butyl aluminum ethoxide, butyl aluminum propoxide, butyl aluminum butoxide, dibutyl alumimium methoxide, dibutyl aluminum ethoxide, dibutyl aluminum propoxide, and dibutyl aluminum butoxide.

In the alkali metal salt of a member selected from cyclopentadienes in the present invention, the said cyclopentadienes indicate cyclopentadiene, substituted cyclopentadiene substituted partially with a hydrocarbon group, as well as compounds having cyclopentadienyl group or substituted cyclopentadienyl group, e.g. organosilicon compounds containing cyclopentadienyl group or substituted cyclopentadienyl group substituted partially with a hydrocarbon group having 1 to 12 carbon atoms.

As substituent groups in the above substituted cyclopentadiene and substituted cyclopentadienyl, those having 1 to 12, preferably 1 to 6, carbon atoms are preferred. Examples are alkyl groups such as methyl, ethyl, propyl, iso-propyl, butyl, t-butyl, hexyl and octyl; aryl groups such as phenyl; and aralkyl groups such as benzyl.

As examples of the foregoing organosilicon compounds there are mentioned compounds represented by the general formula $(Cp)_1 Si r s^3_{4-1}$ in which Cp is cyclopentadiene and/or substituted cyclopentadiene (the substituent group is as exemplified above), $R^3$ is a hydrocarbon group having 1 to 24, preferably 1 to 12, carbon atoms, (e.g. alkyl such as methyl, ethyl, propyl, iso-propyl, butyl, t-butyl, hexyl and octyl, alkoxy such as methoxy, ethoxy, propoxy and butoxy, aryl such as phenyl, aryloxy such as phenoxy, aralkyl such as benzyl), or a hydrogen atom, and L is $1 \leq L \leq 4$, preferably $1 \leq L \leq 3$.

Examples of alkali metal salts of these cyclopentadienes are sodium salts and lithium salts thereof. More concrete examples are cyclopentadiene sodium salt (hereinafter referred to as "sodium cyclopentadiene"; this way of expression will also be applied to other compounds about to be exemplified), lithium cyclopentadiene, Sodium cyclopentadiene, sodium methylcyclopentadien, lithium methylcyclopentadiene, sodium ethylcyclopentadiene, lithium ethylcyclopentadiene, sodium t-butylcyclopentadiene, lithium t-butylcyclopentadiene, sodium hexylcyclopentadiene, lithium hexylcyclopentadiene, sodium octylcyclopentadiene, lithium octylcyclopentadiene, sodium 1,2-dimethylcyclopentadiene, lithium 1,2-dimethylcyclopentadiene, sodium 1,3-dimethylcyclopentadiene, lithium 1,3-dimethylcyclopentadiene, sodium 1,2,4-trimethylcyclopentadiene, lithium 1,2,4-trimethylcyclopentadiene, sodium 1,2,3,4-tetramethylcyclopentadiene, lithium 1,2,3,4-tetramethylcyclopentadiene, sodium pentamethylcyclopentadiene, lithium pentamethylcyclopentadiene, sodium monophenylcyclopentadiene, lithium monophenylcyclopentadiene, sodium benzylcyclopentadiene, lithium benzylcyclopentadiene, sodium monocyclopentadienylsilane, lithium monocyclopentadienylsilane, sodium dicyclopentadienylsilane, lithium dicyclopentadienylsilane, sodium tricyclopentadienylsilane, lithium tricyclopentadienylsilane, sodium tetracyclopentadienylsilane, lithium tetracyclopentadienylsilane, sodium monocyclopentadienylmonomethylsilane, lithium monocyclopentadienylmonomethylsilane, sodium monocyclopentadienylmonoethylsilane, lithium monocyclopentadienylmonoethylsilane, sodium monocyclopentadienyldimethylsilane, lithium monocyclopentadienyldimethylsilane, sodium monocyclopentadienyldiethylsilane, lithium monocyclopentadienyldiethylsilane, sodium monocyclopentadienyltrimethylsilane, lithium monocyclopentadienyltrimethylsilane, sodium monocyclopentadienyltriethylsilane, lithium monocyclopentadienyltriethylsilane, sodium monocyclopentadienylmonomethoxysilane, lithium monocyclopentadienylmonomethoxysilane, sodium monocyclopentadienylmonoethoxysilane, lithium monocyclopentadienylmonoethoxysilane, sodium monocyclopentadienylmonophenoxysilane, lithium monocyclopentadienylmonophenoxysilane, sodium dicyclopentadienylmonomethylsilane, lithium dicyclopentadienylmonomethylsilane, sodium dicyclopentadienylmonoethylsilane, lithium dicyclopentadienylmonoethylsilane, sodium dicyclopentadienyldimethylsilane, lithium dicyclopentadienyldimethylsilane, sodium dicyclopentadienyldiethylsilane, lithium dicyclopentadienyldiethylsilane, sodium dicyclopentadienylmethylethylsilane, lithium dicyclopentadienylmethylethylsilane, sodium dicyclopentadienyldipropylsilane, lithium dicyclopentadienyldipropylsilane, sodium dicyclopentadienylethylpropylsilane, lithium dicyclopentadienylethylpropylsilane, sodium dicyclopentadienyldiphenylsilane, lithium dicyclopentadienyldiphenylsilane, sodium dicyclopentadienylphenylmethylsilane, lithium dicyclopentadienylphenylmethylsilane, sodium dicyclopentadienylmonomethoxysilane, lithium dicyclopentadienylmonomethoxysilane, sodium dicyclopentadienylmonoethoxysilane, lithium dicyclopentadienylmonoethoxysilane, sodium tricyclopentadienylmonomethylsilane, lithium tricyclopentadienylmonomethylsilane, sodium tricyclopentadienylmonoethylsilane, lithium tricyclopentadienylmonoethylsilane, sodium tricyclopentadienylmonomethoxysilane, lithium tricyclopentadienylmonomethoxysilane, sodium tricyclopentadienylmonoethoxysilane, lithium tricyclopentadienylmonoethoxy silane, sodium 3-methylcyclopentadienylsilane, lithium 3-methylcyclopentadienylsilane, sodium bis-3-methylcyclopentadienylsilane, lithium bis-3-methylcyclopentadienylsilane, sodium 3-methylcyclopentadienylmethylsilane, lithium 3-methylcyclopentadienylmethylsilane, sodium 1,2-dimethylcyclopentadienylsilane, lithium 1,2-dimethylcyclopentadienylsilane, sodium 1,3-dimethylcyclopentadienylsilane, lithium 1,3-dimethylcyclopentadienylsilane, sodium 1,2,4-trimethylcyclopentadienylsilane, lithium 1,2,4-trimethylcyclopentadienylsilane, sodium 1,2,3,4-tetramethylcyclopentadienylsilane, lithium 1,2,3,4-tetramethylcyclopentadienylsilane, sodium pentamethylcyclopentadienylsilane and lithium Pentamethylcyclopentadienylsilane, methyl, ethyl, propyl, iso-propyl, butyl, t-butyl, hexyl and octyl, alkoxy such as methoxy, ethoxy, propoxy and butoxy, aryl such as phenyl, aryloxy such as phenoxy, aralkyl such as benzyl, or a hydrogen atom, and L is $1 \leq L \leq 4$, preferably $1 \leq L \leq 3$.

Examples of alkali metal salts of these cyclopentadienes are sodium salts and lithium salts thereof. More concrete examples as cyclopentadiene sodium salt (hereinafter referred to as "sodium cyclopentadiene"; this way of expression will also be applied to other compounds about to be exemplified, lithium cyclopentadiene.

How to prepare such alkali metal salts of cyclopentadienes is not specially limited. For example, they can be prepared easily by contacting cyclopentadienes with metal sodium or lithium in a polar solvent such as ether or tetrahydrofuran.

In the alkali metal salt of a member selected from indenes in the present invention, the said indenes indicate indene, substituted indene substituted partially with a hydrocarbon group, as well as compounds having indenyl group or substituted indenyl group, e.g. organosilicon compounds containing indenyl group or substituted indenyl group substituted partially with a hydrocarbon group having 1 to 12 carbon atoms, and compounds wherein plural indenyl groups and/or substituted indenyl groups are bonded through a lower alkylene group (2 to 6 carbon atoms).

As substituent groups in the above substituted indene and substituted indenyl, those having 1 to 12, preferably 1 to 6, carbon atoms are preferred. Examples are alkyl such as methyl, ethyl, propyl, iso-propyl, butyl, t-butyl, hexyl and octyl, aryl such as phenyl, and aralkyl such as benzyl.

As examples of such organosilicon compounds there are mentioned compounds represented by the general formula $(Ind)_L Sir^3_{4-L}$, in which Ind represents indenyl and/or substituted indenyl the substituent group is as exemplified above), $R^3$ is a hydrocarbon group having 1 to 24, preferably 1 to 12, carbon atoms (e.g. alkyl such as methyl, ethyl, propyl, iso-propyl, butyl, t-butyl, hexyl and octyl, alkoxy such as methoxy, ethoxy, propoxy and butoxy, aryl such as phenyl, aryloxy such as phenoxy, aralkyl such as benzyl), or a hydrogen atom, and L is $1 \leq L \leq 4$, preferably $1 \leq L \leq 3$, more preferably $1 \leq L < 3$.

Examples of alkali metal salts of these indenes are sodium salts and lithium salts thereof. More concrete examples are indene sodium salt ("sodium indene" hereinafter; this way of expression will also be applied to other compounds about to be exemplified), lithium indene, sodium methylindene, lithium methylindene, sodium ethylindene, lithium ethylindene, sodium proylindene, lithium propylindene, sodium t-butylindene, lithium t-butylindene, sodium hexylindene, lithium hexylindene, sodium octylindene, lithium octylindene, sodium 1,2-dimethylindene, lithium 1,2-dimethylindene, sodium 1,3-dimethylindene, lithium 1,3-dimethylindene, sodium monophenylindene, lithium monophenylindene, sodium benzylindene, lithium benzylindene, sodium bisindenylethane, lithium bisindenylethane, sodium bis(4,5,6,7-tetrahydro-1-indenyl)ethane, lithium bis(4,5,6,7-tetrahydro-1-indenyl)ethane, sodium bis(4-methyl-1-indenyl)ethane, lithium bis(4-methyl-1-indenyl)ethane, sodium (5-methyl-1-indenyl)ethane, lithium (5-methyl-1-indenyl)ethane, sodium (6-methyl-1-indenyl) ethane, lithium (6-methyl-1-indenyl)ethane, sodium monoindenylsilane, lithium monoindenylsilane, sodium diindenylsilane, lithium diindenylsilane, sodium triindenylsilane, lithium triindenylsilane, sodium tetraindenylsilane, lithium tetraindenylsilane, sodium monoindenylmonomethylsilane, lithium monoindenylmonomethylsilane, sodium monoindenylmonoethylsilane, lithium monoindenylmonoethylsilane, sodium monoindenyldimethylsilane, lithium monoindenyldimethylsilane, sodium monoindenyldiethylsilane, lithium monoindenyldiethylsilane, sodium monoindenyltrimethylsilane, lithium monoindenyltrimethylsilane, sodium monoindenyltriethylsilane, lithium monoindenyltriethylsilane, sodium monoindenylmonomethoxysilane, lithium monoindenylmonomethoxysilane, sodium monoindenylmonoethoxysilane, lithium monoindenylmonoethoxysilane, sodium monoindenylmonophenoxysilane, lithium monoindenylmonophenoxysilane, sodium diindenylmonomethylsilane, lithium diindenylmonomethylsilane, sodium diindenylmonoethylsilane, lithium diindenylmonoethylsilane, sodium diindenyldimethylsilane, lithium diindenyldimethylsilane, sodium diindenyldiethylsilane, lithium diindenyldiethylsilane, sodium diindenylmethylethylsilane, lithium diindenylmethylethylsilane, sodium diindenyldipropylsilane, lithium diindenyldipropylsilane, sodium diindenylethylpropylsilane, lithium diindenylethylpropylsilane, sodium diindenyldiphenylsilane, lithium diindenyldiphenylsilane, sodium diindenylphenylmethylsilane, lithium diindenylphenylmethylsilane, sodium diindenylmonomethoxysilane, lithium diindenylmonomethoxysilane, sodium diindenylmonoethoxysilane, lithium diindenylmonoethoxysilane, sodium triindenylmonomethylsilane, lithium triindenylmonomethylsilane, sodium triindenylmonoethylsilane, lithium triindenylmonoethylsilane, sodium triindenylmonomethoxysilane, lithium triindenylmonomethoxysilane, sodium triindenylmonoethoxysilane, lithium triindenylmonoethoxysilane, sodium 4,5,6,7-tetrahydro-1-indenylsilane, lithium 4,5,6,7-tetrahydro-1-indenylsilane, sodium 4-methyl-1-indenylsilane, lithium 4-methyl-1-indenylsilane, sodium 6-methyl-1-indenylsilane, lithium 6-methyl-1-indenylsilane, sodium bis-4,5,6,7-tetrahydro-1-indenylsilane, lithium bis-4,5,6,7-tetrahydro-1-indenylsilane, sodium bis-4-methyl-1-indenylsilane, lithium bis-4-methyl-1-indenylsilane, sodium bis-5-methyl-1-indenylsilane, lithium bis-5-methyl-1-indenylsilane, sodium bis-6-methyl-1-indenylsilane, lithium bis-6-methyl-1-indenylsilane, sodium 4,5,6,7-tetrahydro-1-indenylmethylsilane, lithium 4,5,6,7-tetrahydro-1-indenylmethylsilane, sodium 4-methyl-1-indenylmethylsilane, lithium 4-methyl-1-indenylmethylsilane, sodium 5-methyl-1-indenylmethylsilane, lithium 5-methyl-1-indenylmethylsilane, sodium 6-methyl-1-indenylmethylsilane, lithium 6-methyl-1-indenylmethylsilane, sodium 4,5,6,7-tetrahydro-1-indenyldimethylsilane, lithium 4,5,6,7-tetrahydro-1-indenyldimethylsilane, sodium 4-methyl-1-indenyldimethylsilane, lithium 4-methyl-1-indenyldimethylsilane, sodium 5-methyl-1-indenyldimethylsilane, lithium 5-methyl-1-indenyldimethylsilane, sodium 6-methyl-1-indenyldimethylsilane and lithium 6-methyl-1-indenyldimethylsilane, (the substituent group is as exemplified above), $R^3$ is a hydrocarbon group having 1 to 24, preferably 1 to 12, carbon atoms (e.g. alkyl such as methyl, ethyl, propyl, iso-propyl, butyl, t-butyl, hexyl and octyl, alkoxy such as methoxy, ethoxy, propoxy and butoxy, aryl such as phenyl, aryloxy such as phenoxy, aralkyl such as benzyl), or a hydrogen atom, and L is $1 \leq L \leq 4$, preferably $1 \leq L \leq 3$, more preferably $1 \leq L \leq 3$.

Examples of alkali metal salts of these indenes are sodium salts and lithium salts thereof. More concrete examples are indene sodium salt ("sodium indene" hereinafter; this way of expression will also be applied to other compounds about to be exemplified), lithium indene, of couse, these compounds may be used as a mixture of two or more.

The method for preparing these alkali metal salts of indenes is not specially limited. For example, they can be prepared by contacting indenes with metal sodium or lithium in a polar solvent such as ether or tetrahydrofurn.

One component of the catalyst used in the present invention is obtained by contacting a compound of the general formula $Me^1R^1_nX^1_{4-n}$ [component (1)] and an alkali metal salt of a member selected from cyclopentadienes or indenes [component (2)] and, optionally, a compound of the general formula $Me^2R^2_mX^2_{z-m}$ [component (3)] with one another, as mentioned previously. In what order these components are to be contacted is not specially limited. For example, in the case of using only components (1) and (2), both components may be contacted together at a time, or component (2) may be added to and contacted with component (1), or vice versa. In the case of using components (1) to (3), these three components may be contacted together at a time, or components (1) and (3) may first be contacted together, followed by contact with component (2), or components (1) and (2) may first be contacted together, followed by contact with component (3), or components (2) and (3) may first be contacted together, followed by contact with component (1), or a product obtained by contacting a portion of component (2) with component (1) may be contacted with a product obtained by contacting the remaining portion with component (3).

The method of contacting these two or three components is not specially limited. For example, they are contacted with or without stirring, usually in an inert gas atmosphere such as nitrogen or argon and usually in the presence of a liquid inert hydrocarbon such as an aromatic hydrocarbon (usually 6 to 12 carbon atoms), e.g. benzene, toluene, xylene or ethylbenzene, or an aliphatic or alicyclic hydrocarbon (usually 5 to 12 carbon atoms), e.g. heptane, hexane, decane, dodecane or cyclohexane. Conditions for the contact reaction involve a temperature of usually $-100°$ C. to $200°$ C., preferably $-50°$ C. to $100°$ C., and a period of time of 30 minutes to 50 hours, preferably 1 to 24 hours.

In the case of contacting the components in an inert hydrocarbon solvent, the reaction product obtained after completion of the entire contact reaction may be fed as it is in the state of solution to the polymerization, or there may be adopted a method in which such reaction product is subjected to precipitation and drying, then the resulting solid catalyst component is once withdrawn and then used in the polymerization. Of course, the contact reaction of the components may be conducted plural times. Preferably, the three components are used in such a manner that, per mole of component (1), the proportion of component (2) is usually 0.01 to 100 moles, preferably 0.1 to 50 mole, more preferably 0.1 to 20 moles, much more preferably 0.1 to 10 moles, most preferably 1 to 5 moles and that of component (3) is usually 0.01 to 100 moles, preferably 0.1 to 5 moles, more preferably 0.1 to 20 moles, much more preferably 0.1 to 10 moles most preferably 1 to 5 moles.

Modified Organoaluminum Compound

The modified organoaluminum compound used in the present invention is the reaction product of an organoaluminum compound and water and contains 1 to 100, preferably 1 to 50, Al—O—Al bonds in the molecule. The reaction of the organoaluminum compound and water is carried out usually in an inert hydrocarbon. As inert hydrocarbons employable in this reaction there are mentioned aliphatic, alicyclic and acromatic hydrocarbons such as, for example, pentane, hexane, heptane, cyclohexane, methylcyclohexane, benzene, toluene and xylene, with aliphatic and aromatic hydrocarbons being preferred.

The above organoaluminum compound means a compound represented by the general formula $R_nAlX_{3-n}$ wherein R is a hydrocarbon group such as alkyl, alkenyl, aryl or aralkyl, having 1 to 18, preferably 1 to 12, carbon atoms, X is a hydrogen halogen arom, and n is an integer in the range of $1 \leq n \leq 3$. Trialkylaluminum is preferred, in which the alkyl group may be any of methyl, ethyl, propyl, isopropyl, butyl, isobutyl, pentyl, hexyl, octyl, decyl and dodecyl, with methyl being particularly preferred.

The reaction ratio (water/Al mole ratio) of water to the organoaluminum compound is in the range of 0.25/1 to 1.2/1, particularly 0.5/1 to 1/1. The reaction temperature is usually in the range of $-70°$ C. to $100°$ C., preferably $-20°$ C. to $20°$ C. A suitable reaction time is selected usually in the range of 5 min. to 100 hours, preferably 5 min. to 24 hours more preferably 5 min. to 5 hours. As the water which is needed in the reaction, there may be used water of crystallization contained, for example, in a copper sulfate hydrate or an aluminum sulfate hydrate.

According to the present invention, a homo- or copolymerization of an olefin or olefins is performed in the presence of a catalyst comprising the catalyst component and the modified oragnoaluminum compound both described above. The catalyst component and the modified organoaluminum compound may be fed into the polymerization reaction system separately or as a mixture of the two. Suitable proportions of the catalyst component and the modified oragnoaluminum compound are selected in such a manner that the atomic ratio of aluminum in the modified organoaluminum compound to the transition metal in the catalyst component is in the range of 1 to 100,000, preferably 5 to 1,000.

The process of the present invention is applicable to the preparation of various olefin homo- and copolymers. Above all, it is suitable for the homopolymerization of an α-olefin having 2 to 12 carbon atoms, e.g. ethylene, propylene, 1-butene, 1-hexene or 4-methylpentene-1, copolymerization of ethylene and an α-olefin having 3 to 12 carbon atoms, such as, for example, ethylene and propylene, ethylene and 1-butene, ethylene and 1-hexene, or ethylene and 4-methylpentene-1, copolymerization of propylene and 1-butene, and copolymerization of ethylene and two or more kinds of other α-olefins.

In some case, a diene compouns such as, for example, butadiene, 1,4-hexadiene, ethylidene norbornene or dicyclopentadiene is used as a component in the copolymerization for the purpose of modification of the resulting olefin polymer. Also in this case, the process of the present invention is applicable.

In the case of copolymerization, suitable comonomer contents can be selected optionally. When ethylene and an α-olefin having 3 to 12 carbon atoms are to be copolymerized, it is desirable to make adjustment so that the α-olefin content in the resulting ethylene/α-olefin copolymer is not higher than 20 mole %, preferably not higher than 30 mole %, more preferably not higher than 20 mole %.

The polymerization reaction may be carried out in the form of slurry polymerization, solution polymerization or vapor-phase polymerization, in the presence of the specific catalyst described above. Particularly, slurry polymerization or vapor-phase polymerization is preferred. The polymerization of olefin(s) is conducted in a substantially oxygen- and water-free condition and in the presence or absence of an inert hydrocarbon solvent selected from the group consisting of aliphatic hydrocarbons such as hexane and heptane, aromatic hydrocarbons such as benzene, toluene and xylene, and alicyclic hydrocarbons such as cyclohexane and methylcyclohexane. Conditions for the polymerization usually involve a temperature of $20°$ to $200°$ C., preferably $50°$ to $100°$ C. a pressure of atmospheric to 70 kg/cm². G, preferably atmospheric to 20 kg/cm². G, and a polymerization time of 5 minutes to 10 hours, preferably 5 minutes to 5 hours.

The molecular weight of the resulting polymer can be adjusted to some extent by changing such polymerization conditions as polymerization temperature and catalyst mole ratio, but the addition of hydrogen into the polymerization reaction system is more effective for this purpose. The process of the present invention is also applicable to a multi-stage polymerization of two or more stages involving different hydrogen concentrations and different polymerization temperatures.

<EXAMPLES>

The following examples are given to illustrate the present invention more concretely, but it is to be understood that the invention is not limited thereto.

The following methods were adopted to determine physical properties of the polymers obtained in the following working and comparative examples.
Melt Index (MI)
  Determined at $190°$ C., under a load of 2.16 kg, according to ASTEM D 238-57T.
Density
  Determined according to ASTEM D 1505-68.
Determination of Melting Point using Differential Scanning Calorimeter (DSC)
  Using a melting point measuring device Model DSC-20 (a product of Seiko Denshi K.K.), a polymer sample (5 mg) is held at $180°$ C. for 3 minutes, then cooled to $0°$ C. at a rate of $10°$ C./min, and after holding the sample at $0°$ C. for 10 minutes, the temperature is raised at a rate of $10°$ C./min for the determination of melting point.
Mw/Mn
  Determined using a Type 150C GPC device (a product of waters Co.), a column of GMH-6 (a product of Toyo Soda Manufacturing Co.), a solvent of o-dichlorobenzene, and under the conditions of temperature $135°$ C., flow rate 1.0 ml/min.
Degree of Branching
  Butene-1 concentration (pc./1000C) is determined by $^{13}C$-NMR at a temperature of $120°$ C., using an NMR device (a product of Japan Electron Optics Laboratory Co.) and a solvent of ODCB/deuterated benzene, and it is regarded as the degree of branching (ethyl branching degree).
Preparation of Modified Organoaluminum Compound
  Modified organoaluminum compound (methylammoxane: MAO) used in the following working and comparative examples was prepared in the following manner.

13 g of copper sulfate, pentahydrate was placed in a three-necked flask having an internal volume of 300 ml and equipped with an electromagnetic induction stirrer and was suspended in 50 ml of toluene. Then, 150 ml of a solution containing 1 mmol/ml of trimethylaluminum was added dropwise into the resulting suspension at 0° C. over a 2 hour period. Thereafter, the temperature was raised to 25° C. and reaction was allowed to take place at that temperature for 24 hours. Subsequently, the reaction solution was filtered to remove toluene from the solution containing the reaction product to afford 4 g of methylammoxane as white crystals.

Example 1

(1) Preparation of Na Salt of Cyclopentadiene 50 ml of purified tetrahydrofuran (THF) was charged into a three-necked 300 ml, flask, then 11 g of cyclopentadiene and 4 g of metal sodium were added and reaction was allowed to take place at reflux for 4 hours. Thereafter, unreacted sodium was removed and then a 2 mols/l THF solution was prepared using the reaction product.

(2) Preparation of Catalyst Component 43 ml of purified toluene was placed into a three-necked 300 ml flask, then 1.6 g of tetrapropoxyzirconium (Zr(OPr)$_4$) and 5 ml of cyclopentadiene sodium salt (2 mols/l THF solution) were added and stirring was conducted at room temperature for 30 minutes. Then, into the resulting solution was added the whole amount of a separately-prepared triethylaluminum (TEA) solution in toluene (a 2.8 ml TEA solution in 47 ml toluene) at room temperature over a 30 minute period, and stirring was performed for another 1 hour to obtain a catalyst component A as a solution. All of these operations were conducted in a nitrogen atmosphere.

(3) Vapor Phase Polymerization

A stainless steel 3-liter autoclave equipped with a stirrer was purged with nitrogen and 200 g of dried NaCl was added into the autoclave. Further added were the catalyst component A in an amount of 1.3 mg as zirconium atom and 14 ml of a methylammoxane (MAO) solution (1 mmol/ml), followed by heating to 60° C. under stirring. Then, a gaseous mixture of ethylene and butene-1 (butene-1/ethylene mol ratio: 0.25) was fed into the autoclave to a total pressure of 9 kgf/cm$^2$ and polymerization was started. The polymerization was continued for 2 hours while maintaining the total pressure at 9 kgf/cm$^2$ under continuous supply of gaseous ethylene/butene-1 mixture (butene-1/ethylene mol ratio: 0.05).

Thereafter, surplus mixed gas was discharged, followed by cooling, then the contents were withdrawn to obtain 127 g of a white polymer. The ethylene/butene-1 copolymer thus obtained had a melt index (MI) of 25, a density of 0 9187 g/cm$^3$, an Mw/Mn of 4.5, a degree of branching of 17.5 pcs./1000C, a narrow composition distribution and a melting point of 103.0° C. Catalyst activity was 98,000 g.copolymer/g.Zr.

Example 2

(1) Preparation of Catalyst Component 43 ml of purified toluene was placed into a three-necked 300 ml flask, then 1.6 g of tetrapropoxyzirconium (Zr(OPr)$_4$) and 5 ml of cyclopentadiene sodium salt (2 mols/l THF solution) were added, and stirring was conducted at room temperature for 30 minutes. Into the resulting solution was then added a separately-prepared mixed solution consisting of 10 ml of an ethylmagnesium chloride (EtMgCl) solution in THF (2 mols/l THF) and 40 ml of toluene, at room temperature over a 30 minute period, and stirring was further performed for 1 hour to afford a catalyst component B as a solution. All of these operations were conducted in a nitrogen atmosphere.

(2) Vapor phase polymerization

A vapor phase polimerization was carried out in the same way as in Example 1 except that the catalyst component B was used in an amount of 1.4 mg as zirconium atom in place of the catalyst component A, provided the amount of MAO was changed so as to give an Al/Zr ratio of 1,000.

Thereafter, surplus mixed gas was discharged, followed by cooling, and the contents were withdrawn to afford 134 g of a white polymer. The ethylene/butene-1 copolymer thus obtained had an MI of 30, a density of 0.9219 g/cm$^3$, an Mw/Mn of 4.3, a melting point of 105.1° C. and a degree of branching of 16 pcs./1000C. Catalytic activity was 96,000 g.copolymer/g.Zr.

Example 3

(1) Preparation of Catalyst Component 43 ml of purified toluene was placed into a three-necked 300 ml flask, then 1.2 g of tetrachlorozirconium (ZrCl$_4$) and 7.5 ml of cyclopentadiene sodium salt (2 mols/l THF solution) were added and stirring was conducted at room temperature for 30 minutes. Into the resulting solution was then added a separately-prepared mixed solution consisting of 15 ml of an ethylmagnesium chloride (EtMgCl) solution in THF (2 mols/l THF) and 40 ml of toluene, at room temperature over a 30 minute period, and stirring was further conducted for 1 hour to obtain a catalyst component C as a solution. All of these operations were performed in a nitrogen atmosphere.

(2) Vapor Phase Polymerization

A vapor phase polymerization was carried out in the same way as in Example 1 except that the catalyst component C was used in an amount of 1.4 mg as zirconium atom in place of the catalyst component A, provided the amount of MAO was changed so as to give an Al/Zr ratio of 1,000.

Thereafter, surplus mixed gas was discharged, followed by cooling, and the contents were withdrawn to obtain 66 g of a white polymer. The ethylene/butene-1 copolymer thus obtained had an MI of 100, a density of 0.9225 g/cm$^3$, an Mw/Mn of 3.1 and a melting point of 105.8° C. Catalytic activity was 47,000 g.copolymer/g.Zr.

Example 4

(1) Preparation of Tetrabenzylzirconium 5 g of zirconium tetrachloride was reacted with 12.9 g of benzyl magnesium chloride in ether. Stirring was conducted at 20° C. for 2 hours and thereafter at room temperature for 1 hour. Magnesium chloride precipitated in the reaction was filtered off, leaving a yellow ether solution, to obtain a tetrabenzylzirconium ether solution. In 200 ml of this solution there was contained 5.1 g of tetrabenzylzirconium.

(2) Preparation of Catalyst Component 43 ml of purified toluene was charged into a three-necked 300 ml flask, then the ether solution prepared above, in an amount corresponding to 2.3 g of tetrabenzylzirconium (ZrBz$_4$), and 7.5 ml of cyclopentadiene lithium salt (2 mols/l THF solution) were added, followed by stirring at room temperature for 30 minutes.

Into the resulting solution was then added a separately-prepared mixed solution consisting of 15 ml of an ethylmagnesium chloride (EtMgCl) solution in THF (2 mols/l THF) and 40 ml of toluene, at room temperature over a 30 minute period, and stirring was further conducted for 1 hour to obtain a catalyst component D as a solution. All of these operations were performed in a nitrogen atmosphere.

(3) Vapor Phase Polymerization

A Vapor phase polymerization was carried out in the same way as in Example 1 except that the catalyst component C was used in an amount of 1.6 mg as zirconium atom in place of the catalyst component A, provided the amount of MAO was changed so as to give an Al/Zr ratio of 2000.

Thereafter, surplus mixed gas was discharged, followed by cooling, and the contents were withdrawn to afford 118 g of a white polymer. The ethylene/butene-1 copolymer thus obtained had an MI of 21, a density of 0.9227 g/cm$^3$, an Mw/Mn of 4.2 and a melting point of 106.1° C. Catalytic activity was 74,000 g.copolymer/g.Zr.

Example 5

(1) Preparation of 1,2,4-Trimethylcyclopentadiene Sodium Salt

Into a three-necked 100 ml flask were placed 50 ml of THF, then 20 g of 1,2,4-trimethylcyclopentadiene and 4 g of metal sodium, and reaction was allowed to take place at reflux for 4 hours. Thereafter, unreacted sodium was removed to prepare a solution containing 2 mols/l THF of 1,2,4-trimethylcyclopentadiene sodium salt.

(2) Preparation of Catalyst Component

Into a three-necked 300 ml flask were placed 43 ml of toluene, then 1.6 g of Zr(OPr)$_4$ and 5 ml 1,2,4-trimethylcyclopentadiene sodium salt (2 mols/l THF solution), and stirring was conducted at room temperature for 30 minutes. Into the resulting solution was then added a separately-prepared mixed solution consisting of 25 ml of a trimethylaluminum solution in toluene (2 mols/l THF) and 30 ml of toluene, at room temperature over a 30 minute period, and stirring was further performed for 1 hour to obtain a catalyst component E as a solution. All of these operations were carried out in a nitrogen atmosphere.

(3) Vapor Phase Polymerization

A vapor phase polymerization was conducted in the same way as in Example 1 except that the catalyst component E was used in an amount of 1.5 mg as zirconium atom in place of the catalyst component A, provided the amount of MAO was changed so as to give an Al/Zr ratio of 500.

Thereafter, surplus mixed gas was discharged, followed by cooling, and the contents were withdrawn to yield 98 g of a white polymer. The ethylene/butene-1 copolymer thus obtained had an MI of 8, a density of 0.9213 g/cm$^3$, an Mw/Mn of 8.7 and a melting point of 104.8° C. Catalytic activity was 65,000 g.copolymer/g.Zr.

Example 6

(1) Preparation of Catalyst Component

Into a three-necked 300 ml flask were placed 43 ml of purified toluene, then 1.6 g of Zr(OPr)$_4$ and 5 ml of cyclopentadienyltrimethylsilane sodium salt (2 mols/l tetrahydrofuran (THF) solution), and stirring was conducted at room temperature for 30 minutes. Into the resulting solution was then added the whole amount of a separately-prepared triethylaluminum (TEA) solution in toluene (a solution of 5.6 ml TEA in 47 ml toluene) at room temperature over a 30 minute period, and stirring was further performed for 1 hour to obtain a catalyst component F as a solution. All of these operations were carried out in a nitrogen atmosphere.

(2) Vapor Phase Polymerization

A vapor phase polymerization was conducted in the same way as in Example 1 except that the catalyst component F was used in an amount of 1.3 mg as zirconium atom in place of the catalyst component A, provided the amount of MAO was changed so as to give an Al/Zr ratio of 1,000.

Thereafter, surplus mixed gas was discharged, followed by cooling, and the contents were withdrawn to afford 66 g of a white polymer. The ethylene/butene-1 copolymer thus obtained had an MI of 11, a density of 0.9110 g/cm$^3$, an Mw/Mn of 5.2 and a melting point of 98.5° C. Catalytic activity was 103,000 g.copolymer/g.Zr.

Example 7

(1) Preparation of Catalyst Component

Into a three-necked 300 ml flask were placed 43 ml of toluene, then 1.2 g of ZrCl$_4$ and 5 ml of cyclopentadiene sodium salt (2 mols/l THF solution), and stirring was conducted at room temperature for 30 minutes. Into the resulting solution was then added the whole amount of a separately-prepared solution of 2.8 ml methyllithium in 47 ml toluene at room temperature over a 30 minute period, and stirring was further conducted for 1 hour to obtain a catalyst component G as a solution. All of these operations were carried out in a nitrogen atmosphere.

(2) Vapor Phase Polymerization

A vapor phase polymerization was conducted in the same way as in Example 1 except that the catalyst component G was used in an amount of 1.4 mg as zirconium atom in place of the catalyst component A, provided the amount of MAO was changed so as to give an Al/Zr ratio of 1,000.

Thereafter, surplus mixed gas was discharged, followed by cooling, and the contents were withdrawn to yield 69 g of a white polymer. The ethylene/butene-1 copolymer thus obtained had an MI of 98, a density of 0.9223 g/cm$^3$, an Mw/Mn of 3.3 and a melting point of 106.5° C. Catalytic activity was 49,000 g.copolymer/g.Zr.

Example 8

(1) Preparation of Catalyst Component

Into a three-necked 300 ml flask were charged 43 ml of purified toluene, then 1.9 g of tetrabutoxyzirconium and 5 ml of cyclopentadiene sodium salt (2 mols/l THF solution), and stirring was conducted at room temperature for 30 minutes. Into the resulting solution was then added 25 ml of a separately-prepared butyl lithium solution in THF (2 mols/l) at room temperature over a 30 minute period, and stirring was further conducted for 1 hour to obtain a catalyst component H as a solution. All of these operations were carried out in a nitrogen atmosphere.

(2) Vapor Phase Polymerization

A vapor phase polymerization was conducted in the same way as in Example 1 except that in place of the catalyst component A there was used the catalyst component H in an amount of 1.3 mg as zirconium atom, provided the amount of MAO was changed so as to give an Al/Zr ratio of 1,000.

Thereafter, surplus mixed gas was discharged, followed by cooling, and the contents were withdrawn to afford 66 g of a white polymer. The ethylene/butene-1 copolymer thus obtained had an MI of 33, a density of 0.9253 g/cm$^3$, an Mw/Mn of 4.7 and a melting point of 106.8° C. Catalytic activity was 51,000 g.copolymer/g.Zr.

Example 9

(1) Preparation of Catalyst Component

Into a three-necked 300 ml flask were placed 43 ml of purified toluene, then 1.2 g of Zr(OPr)$_2$Cl$_2$ and 10 ml of cyclopentadienyldimethylsilane sodium salt (2 mols/l THF solution), and stirring was conducted at room temperature for 30 minutes. Into the resulting solution was then added the whole amount of a separately-prepared solution of 6.1 ml diethylaluminum ethoxide in 47 ml toluene at room temperature over a 30 minute period, and stirring was further conducted for 1 hour to obtain a catalyst component I as a solution. All of these operations were carried out in a nitrogen atmosphere.

(2) Vapor Phase Polymerization

A vapor phase polymerization was conducted in the same way as in Example 1 except that in place of the catalyst component A there was used the catalyst component I in an amount of 1.3 mg as zirconium atom, provided the amount of MAO was changed so as to give an Al/Zr ratio of 1,000.

Thereafter, surplus mixed gas was discharged, followed by cooling, and the contents were withdrawn to afford an 44 g of a white polymer. The ethylene/butene-1 copolymer thus obtained had an MI of 23, a density of 0.9210 g/cm$^3$, an Mw/Mn of 5.9 and a melting point of 104.5° C. Catalytic activity was 57,000 g.copolymer/g.Zr.

Example 10

(1) Vapor Phase Polymerization

A stainless steel 3-liter autoclave equipped with a stirrer was purged with nitrogen, into which was placed 200 g of dried NaCl. Further added were the catalyst component A used in Example 1, in an amount of 1.2 mg as zirconium atom, and 14 ml of an MAO solution (1 mmol/ml), followed by heating to 60° C. under stirring. Subsequently, ethylene gas was fed to a total pressure of 9 kgf/cm$^2$ and polymerization was started. The polymerization was continued for 2 hours while maintaining the total pressure at 9 kgf/cm$^2$ under continuous supply of ethylene gas.

Thereafter, surplus mixed gas was discharged, followed by cooling, and the contents were withdrawn to afford 139 g of a white polymer. The ethylene polymer thus obtained had an MI of 15, a density of 0.9295 g/cm$^3$, an Mw/Mn of 4.8 and a melting point of 132.3° C. Catalytic activity was 108,000 g.polymer/g.Zr.

Example 11

(1) Preparation of Catalyst Component

Into a three-necked 300 ml flask were fed 43 ml of purified toluene, then 1.6 g of Zr(OPr)$_4$ and 5 ml of bis(monomethylcyclopentadienyl) dimethylsilane sodium salt (2 mols/l THF solution), and stirring was conducted at room temperature for 30 minutes. Into the resulting solution was then added the whole amount of a separately-prepared solution of 2.8 ml triethylaluminum in 47 ml toluene at room temperature over a 30 minute period, and stirring was further conducted for 1 hour to obtain a catalyst component J as a solution. All of these operations were carried out in a nitrogen atmosphere.

(2) Vapor Phase Polymerization

A stainless steel 3-liter autoclave equipped with a stirrer was purged with nitrogen and then charged with 200 g of dried NaCl. Further added were the catalyst component J in an amount of 1.2 mg as zirconium atom, and 14 ml of an MAO solution (1 mmol/ml), followed by heating to 60° C. under stirring. Subsequently, propylene gas was fed to a total pressure of 9 kgf/cm$^2$ and polymerization was started. The polymerization was continued for 2 hours while propylene gas was fed continuously to maintain the total pressure at 9 kgf/cm$^2$.

Thereafter, surplus mixed gas was discharged, followed by cooling, and the contents were withdrawn to yield 36 g of a white polymer. The propylene polymer thus prepared had an MI of 29, a density of 0.9007 g/cm$^3$, an Mw/Mn of 4.3 and a melting point of 85.3° C. Catalytic activity was 21,000 g.polymer/g.Zr.

Example 12

(1) Preparation of Catalyst Component

Into a three-necked 300 ml flask were placed 43 ml of toluene, then 1.7 g of tetrabutoxytitanium and 5 ml of cyclopentadiene sodium salt (2 mols/l THF solution), and stirring was conducted at room temperature for 30 minutes. Into the resulting solution was then added the whole amount of a separately-prepared solution of 5.0 ml tributylaluminum in 47 ml toluene at room temperature over a 30 minute period, and stirring was further conducted for 1 hour to obtain a catalyst component K as a solution. All of these operations were carried out in a nitrogen atmosphere.

(2) Vapor Phase Polymerization

A vapor phase polymerization was conducted in the same way as in Example 1 except that in place of the catalyst component A there was used the catalyst component K in an amount of 1.6 mg as titanium atom, provided the amount of MAO was changed so as to give an Al/Ti ratio of 1,000.

Thereafter, surplus mixed gad was discharged, followed by cooling, and the contents were withdrawn to afford 13 g of a white polymer. The ethylene/butene-1 copolymer thus obtained had an MI of 11, a density of 0.9235 g/cm$^3$, an Mw/Mn of 4.1 and a melting point of 105.1° C. Catalytic activity was 21,000 g.copolymer/g.Zr.

Example 13

(1) Preparation of Catalyst Component

Into a three-necked 300 ml flask were fed 43 ml of purified toluene, then 2.1 g of tetrabutoxyhafnium and 5 ml of cyclopentadiene sodium salt (2 mols/l THF solution), and stirring was conducted at room temperature for 30 minutes. Into the resulting solution was then added the whole amount of a separately-prepared solution of 2.0 ml trimethylaluminum in 47 ml toluene at room temperature over a 30 minute period, and stirring was further conducted for 1 hour to obtain a catalyst component L as a solution. All of these operation were carried out in a nitrogen atmosphere.

(2) Vapor Phase Polymerization

A vapor phase polymerization was performed in the same way as in Example 1 except that in place of the catalyst A there was used the catalyst L in an amount of 2.1 mg as hafminum atom, provided the amount of MAO was changed so as to give an Al/Hf ratio of 1,000.

Thereafter, surplus mixed gas was discharged, followed by cooling, and the contents were withdrawn to afford 66 g of a white polymer. The ethylene/butene-1 copolymer thus prepared had an MI of 21, a density of 0.9219 g/cm$^3$, an Mw/Mn of 2.9 and a melting point of 104.6° C. Catalytic activity was 32,000 g.copolymer/g.Hf.

Example 14

(1) Preparation of Catalyst Component

Into a three-necked 300 ml flask were fed 43 ml of purified toluene, then 1.6 g of tetrapropoxyzirconium (Zr(OPr)$_4$) and 5 ml of cyclopentadiene sodium salt (2 mols/l THF solution), and stirring was conducted at room temperature for 30 minutes. A further 1 hour stirring afforded a catalyst component M. All of these operations were carried out in a nitrogen atmosphere.

(2) Vapor Phase Polymerization

A vapor phase polymerization was conducted in the same way as in Example 1 except that in place of the catalyst A there was used the catalyst M in an amount of 2.5 mg as zirconium atom, provided the amount of MAO was changed so as to give an Al/Zr ratio of 1,000.

Thereafter, surplus mixed gas was discharged, followed by cooling, and the contents were withdrawn to afford 30 g of a white polymer. The ethylene/butene-1 copolymer thus prepared had an MI of 9, a density of 0.9215 g/cm$^3$, an Mw/Mn of 4.2 and a melting point of 104.2° C. Catalytic activity was 29,000 g.copolymer/g.Zr.

Example 15

(1) Liquid Phase Polymerization

A stainless steel 3-liter autoclave equipped with a stirrer was purged with nitrogen. Into the autoclave were fed 500 ml of toluene, then the catalyst component F used in Example 6, in an amount of 0.6 mg as zirconium atom, 3.3 ml of an MAO solution (1 mmol/ml) and further 60 ml of hexene, followed by heating to 60° C., and polymerization was performed for 2 hours while ethylene gas was fed continuously to maintain the total pressure at 9 kgf/cm$^2$.

Thereafter, surplus gas was discharged, then ethanol was added to deactivate the catalyst, followed by drying, to yield 66 g of an ethylene/hexene-1 copolymer. The ethylene polymer thus prepared had an MI of 2.7, a density of 0.9196 g/cm$^3$, an Mw/Mn of 3.6 and a melting point of 101.3° C. Catalytic activity was 110,000 g.copolymer/g.Zr.

Comparative Example 1

(1) Preparation of Catalyst Component

Into a three-necked 300 ml flask were fed 100 ml of toluene and then 4.2 g of Zr(OPr)$_4$, followed by stirring at room temperature to obtain a catalyst component A'. All of the operations were carried out in a nitrogen atmosphere.

(2) Vapor Phase Polymerization

A vapor phase polymerization was performed in the same manner as in Example 1 except that the catalyst component A was substituted by the catalyst component A' in an amount of 1.3 mg as zirconium atom, provided the amount of MAO was changed so as to give an Al/Zr ratio of 1,000. But there was not produced any polymer.

Comparative Example 2

(1) Preparation of Catalyst component 100 ml of toluene was charged into a three-necked 300 ml flask, then 4.2 g of tetrabenzylzirconium was added, and stirring was conducted at room temperature to obtain a catalyst component B'. All of the operations were carried out in a nitrogen atmosphere.

(2) Vapor Phase Polymerization

A vapor phase polymerization was performed in the same manner as in Example 1 except that the catalyst component A was substituted by the catalyst component B' in an amount of 1.5 mg as zirconium atom, provided the amount of MAO was changed so as to give an Al/Zr ratio of 1,000. But there was not produced any polymer.

Comparative Example 3

(1) Preparation of Catalyst Component

Into a three-necked 300 ml flask were fed 100 ml of purified toluene and then 4.2 g of tetrachlorozirconium, followed by stirring at room temperature to prepare a catalyst component C'. All of the operations were carried out in a nitrogen atmosphere.

(2) Vapor Phase Polymerization

A vapor phase polymerization was conducted in the same manner as in Example 1 except that the catalyst Component A was substituted by the catalyst component C' in an amount of 1.4 mg as zirconium atom, provided the amount of MAO was changed so as to give an Al/Zr ratio of 1,000. But there was not produced any polymer.

Comparative Example 4

(1) Preparation of Catalyst Component

Into a three-necked 300 ml flask were placed 43 ml of purified toluene and then 1.6 g of Zr(OPr)$_4$, and stirring was conducted at room temperature for 30 minutes. Into the resulting solution was then added the whole amount of a separately-prepared solution of 2.8 ml tetraethylaluminum (TEA) in 2.8 ml toluene at room temperature over a 30 minute period, and stirring was further conducted for 1 hour to obtain a catalyst component D' as a solution. All of these operations were carried out in a nitrogen atmosphere.

(2) Vapor Phase Polymerization

A vapor phase polymerization was performed in the same manner as in Example 1 except that the catalyst component A was substituted by the catalyst component D' in an amount of 1.5 mg as zirconium atom, provided the amount of MAO was changed so as to give an Al/Zr ratio of 1,000. But there was not produced any polymer.

Comparative Example 5

(1) Preparation of Catalyst Component

Into a three-necked 300 ml flask were placed 43 ml of purified toluene and then 1.6 g of tetrabenzylzirconium, and stirring was conducted at room temperature for 30 minutes. Into the resulting solution was then added the whole amount of a separately-prepared solution of 2.8 ml triethylaluminum (TEA) in 47 ml toluene at room temperature over a 30 minute period, and stirring was further conducted for 1 hour to prepare a catalyst component E' as a solution. All of these operations were carried out in a nitrogen atmosphere.

(2) Vapor Phase Polymerization

A vapor phase polymerization was performed in the same manner as in Example 1 except that in place of the catalyst component A there was used the catalyst component E' in an amount of 1.3 mg as zirconium atom, provided the amount of MAC was changed so as to give an Al/ZR ratio of 1,000.

Thereafter, surplus mixed gas was discharged, followed by cooling, and the contents were withdrawn to afford 8 g of a white polymer. The ethylene/butene-1 copolymer thus prepared had an MI of 1.3, a density of 0.9252 g/cm$^3$, an Mw/Mn of 5.1 and a melting point of 117.3° C. Catalytic activity was as low as 6,000 g.copolymer/g.Zr. The polymer was inferior in physical properties.

Comparative Example 6

(1) Preparation of Catalyst Component

Into a three-necked 300 ml flask were placed 43 ml of purified toluene and then 1.6 g of tetrachlorozirconium, and stirring was conducted at room temperature for 30 minutes. Into the resulting solution was then added the whole amount of a separately-prepared solution of 2.8 ml triethylaluminum (TEA) in 47 ml toluene at room temperature over a 30 minute period, and stirring was further conducted for 1 hour to obtain a catalyst component F' as a solution. All of these operations were carried out in a nitrogen atmosphere.

(2) Vapor Phase Polymerization

A vapor phase polymerization was performed in the same manner as in Example 1 except that in place of the catalyst component A there was used the catalyst component F' in an amount of 1.5 mg as zirconium atom, provided the amount of MAO was changed so as to give an Al/ZR ratio of 1,000. But there was not produced any polymer.

Comparative Example 7

(1) Preparation of Catalyst Component

Into a three-necked 300 ml flask were placed 43 ml of purified toluene and then 1.9 g of tetrabutoxyzirconium, and stirring was conducted at room temperature for 30 minutes. Into the resulting solution was then added 25 ml of a separately-prepared butyllithium solution in THF (2 mols/l) at room temperature over a 30 minute period, and stirring was further conducted for 1 hour to prepare a catalyst component G' as a solution. All of these operations were carried out in nitrogen atmosphere.

(2) Vapor Phase Polymerization

A vapor phase polymerization was performed in the same manner as in Example 1 except that in place of the catalyst component A there was used the catalyst component in an amount of 1.6 mg as zirconium atom, provided the amount of MAO was changed so as to give an Al/Zr ratio of 1,000. But there was not produced any polymer.

Comparative Example 8

(1) Preparation of Catalyst Component

Into a three-necked 300 ml flask were placed 43 ml of purified toluene and then the foregoing ether solution in an amount corresponding to 2.3 g of tetrabenzylzirconium (ZrBz$_4$), and stirring was conducted at room temperature for 30 minutes. Into the resulting solution was then added a separately-prepared mixed solution consisting of 15 ml of a methyllithium solution in THF (2 mols/l THF) and 40 ml toluene, at room temperature for 30 minute period, and stirring was further conducted for 1 hour to prepare a catalyst component H' as a solution. All of these operations were carried out in a nitrogen atmosphere.

(2) Vapor Phase Polymerization

A vapor phase polymerization was performed in the same manner as in Example 1 except that in place of the catalyst component A there was used the catalyst component H' in an amount of 1.5 mg as zirconium atom, provided the amount of MAO was changed so as to give an Al/Zr ratio of 1,000.

Thereafter, surplus mixed gas was discharged, followed by cooling, and the contents were withdrawn to affored 12 g of a white polymer. The ethylene/butene-1 copolymer thus prepared had an MI of 1.9, a density of 0.9221 g/cm$^3$, an Mw/Mn of 5.3 and a melting point of 116.3° C. Catalytic activity was as low as 8,000 g.copolymer/g.Zr. The polymer was inferior in physical properties.

Comparative Example 9

(1) Preparation of Catalyst Component

Into a three-necked 300 ml flask were fed 43 ml of purified toluene and then 1.2 g of ZrC$_4$, and stirring was conducted at room temperature for 30 minutes. Into the resulting solution was then added 5 ml of a separately-prepared methyllithium solution in THF (2 mols/l) at room temperature over a 30 minute period, and stirring was further conducted for 1 hour to prepare a catalyst component I' as a solution. All of these operations were carried out in a nitrogen atmosphere.

(2) Vapor Phase Polymerization

A vapor phase polymerization was performed in the same manner as in Example 1 except that in place of the catalyst component A there was used the catalyst component I' in an amount of 1.4 mg as zirconium atom, provided the amount of MAO was changed so as to give an Al/Zr ratio of 1,000. But there was not produced any polymer.

Comparative Example 10

(1) Preparation of Catalyst Component

Into a three-necked 300 ml flask were fed 43 ml of purified toluene and then 1.6 g of ZP(OPP)$_4$, and stirring was conducted at room temperature for 30 minutes. Into the resulting solution was then added a separately-prepared mixed solution consisting of 10 ml of an ethylmagnesium chloride (EtMgCl) solution in THF (2 mols/l THF) and 40 ml toluene, at room temperature over a 30 minute period, and stirring was further conducted for 1 hour to prepare a catalyst component J' as a solution. All of these operations were carried out in a nitrogen atmosphere.

(2) Vapor Phase Polymerization

A vapor phase polymerization was performed in the same manner as in Example 1 except that the catalyst component J' was used in an amount of 1.6 mg as zirconium atom in place of the catalyst component A, provided the amount of MAO was changed so as to give an Al/Zr ratio of 1,000. But there was not produced any polymer.

Comparative Example 11

(1) Preparation of Catalyst Component

Into a three-necked 300 ml flask were fed 43 ml of toluene and then the foregoing ether solution in an amount corresponding to 2.3 g of tetrabenzylzirconium (ZrBz$_4$), and stirring was conducted at room temperature for 30 minutes. Into the resulting solution was then added a separately-prepared mixed solution consisting of 15 ml of an ethylmagnesium chloride (EtMgCl) solution in THF (2 mols/1 THF) and 40 ml toluene, at room temperature over a 30 minute period, and stirring was further conducted for 1 hour to prepare a catalyst component K' as a solution. All of these operations were carried out in a nitrogen atmosphere.

(2) Vapor Phase Polymerization

A vapor phase polymerization was performed in the same manner as in Example 1 except that the catalyst component K' was used in an amount of 1.7 mg as/zirconium in place of catalyst component A, provided the amount of MAO was changed so as to give an Al/Zr ratio of 1,000.

Thereafter, surplus mixed gas was discharged, followed by cooling, and the contents were withdrawn to obtain 26 g of a white polymer. The Ethylene/butene-1 copolymer thus prepared had an MI of 2.1, a density of 0.9219 g/cm$^3$, an Mw/Mn of 5.2 and a melting point of 114.9° C. Catalytic activity was 15,000 g.copolymer/g.Zr. The polymer was inferior in physical properties.

Comparative Example 12

(1) Preparation of Catalyst Component

Into a three-necked 300 ml flask were charged 43 ml of purified toluene and then 1.2 g of tetrachlorozirconium (ZrCl$_4$), and stirring was conducted at room temperature for 30 minutes. Then, into the resulting solution was added a separately-prepared mixed solution consisting of 15 ml of an ethylmagnesium chloride (EtMgCl) solution in THF (2 mols/1 THF) and 40 ml toluene, at room temperature over a 30 minute period, and stirring was further conducted for 1 hour to prepare a catalyst component L' as a solution. All of these operations were carried out in a nitrogen atmosphere.

(2) Vapor Phase Polymerization

A vapor phase polymerization was performed in the same manner as in Example 1 except that the catalyst component L' was used in an amount of 1.4 mg as zirconium atom in place of the catalyst component A, provided the amount of MAO was changed so as to give an Al/Zr ratio of 1,000. But there was not produced any polymer.

Comparative Example 13

(1) Preparation of Catalyst Component 3.8 mg of zirconocene chloride was dissolved in 13 ml of an MAO solution in toluene (1 mmol/ml) at room temperature, and stirring was conducted at room temperature for 30 minutes to prepare a catalyst component. All of the operations were carried out in a nitrogen atmosphere.

(2) Vapor phase Polymerization

A stainless steel 3-liter autoclave equipped with a stirrer was purged with nitrogen and charged with the catalyst component prepared above and 200 g of dried NaCl, followed by heating to 60° C. under stirring. Subsequently, a gaseous nixture of ethylene and butene-1 (butene-1/ethylene mol ratio: 0.25) was fed to a total pressure of 9 kgf/cm$^2$ and polymerization was started. The polymerization was continued for 2 hours while a gaseous mixture of ethylene and butene-1 (butene-1/ethylene mol ratio: 0.05) was fed continuously to maintain the total pressure at 9 kgf/cm$^2$.

Thereafter, surplus mixed gas was discharged, followed by cooling, and the contents were withdrawn to afford 127 g of a white polymer. The ethylene/butene-1 copolymer thus prepared had an MI of 25, a density of 9102 g/cm$^3$, an Mw/Mn of 7 9, a degree of branching of 32.4 pcs./1000C and a melting point of 97.8° C. Catalytic activity was 64,000 g.copolymer/g.Zr.

Example 16

(1) Preparation of Indene Sodium Salt 50 ml of purified tetrahydrofuran (THF) was charged into a three-necked 300 ml flask, then 20 g of indene and 4 g of metal sodium were added, and reaction was allowed to take place at reflux for 4 hours. Thereafter, unreacted sodium was removed and then a 2 mols/1 THF solution was prepared using the reaction product.

(2) Preparation of Catalyst Component

Into three-necked 300 ml flask were placed 43 ml of toluene, then 1.6 g of tetrapropoxyzirconium (Zr(OPr)$_4$) and 5 ml of the indene sodium salt solution in THF prepared above, followed by stirring at room temperature for 30 minutes. Then, into the resulting solution was added the whole amount of a separately-prepared 2.8 ml triethylaluminum (TEA) solution in 47 ml toluene at room temperature over a period of 30 minutes, and stirring was further conducted for 1 hour to prepare a catalyst component A as a solution. All of these operations were carried out in a nitrogen atmosphere.

(3) Vapor Phase Polymerization

A stainless steel 3-liter autoclave equipped with a stirrer was purged with nitrogen and charged with 200 g of dried NaCl, then the catalyst component A in amount of 1.2 mg as zirconium atom and 13 ml of a methylammoxane (MAO) solution (1 mmol/ml), followed by heating to 60° C. under stirring. Subsequently, a gaseous mixture of ethylene and butene-1 (butene-1/ethylene mol ratio: 0.25) was fed to a total pressure of 9 kgf/cm$^2$ and polymerization was started. The polymerization was continued for 2 hours while a gaseous mixture of ethylene and butene-1 (butene-1/ethylene mol ratio: 0.05) was fed continuously to maintain the total pressure at 9 kgf/cm$^2$.

Thereafter, surplus mixed gas was discharged, followed by cooling, and the contents were withdrawn to yield 100 g of a a white polymer. The ethylene/butene-1 copolymer thus prepared had an MI of 0.9, a density of 0.9217 g/cm$^3$, an Mw/Mn of 4.8 and a melting point of 114.3° C. Catalytic activity was 84,000 g.copolymer/g.Zr. The degree of branching of the copolymer was 15 (pcs./1000C) and the composition distribution thereof was extremely narrow.

Example 17

(1) Preparation of Catalyst Component

Into a three-necked 300 ml flask were placed 43 ml of toluene, then 1.6 g of tetrapropoxyzirconium (Zr(Opr)$_4$) and 5 ml of indene sodium salt (2 mols/1 THE solution), and stirring was conducted at room temperature for 30 minutes. Into the resulting solution was then added a separately-prepared mixed solution consisting of 10 ml of an ethylmagnesium bromide (EtMgBr) solution in THE (2 mols/1 THF) and 40 ml toluene, at room temperature over a period of 30 minutes, and stirring was further conducted for 1 hour to prepare a catalyst component B. All of these operations were carried out in a nitrogen atmosphere.

(2) Vapor Phase Polymerization

A vapor phase polymerization was conducted in the same way as in Example 16 except that in place of the catalyst component A there was used the catalyst component B in an amount of 1.4 mg as zirconium atom, provided the amount of MAO was changed so as to give an Al/Zr ratio of 1,000.

Thereafter, surplus mixed gas was discharged, followed by cooling, and the contents were withdrawn to yield 123 g of a white polymer. The ethylene/butene-1 copolymer thus prepared had an MI of 0.7, a density of 0.9231 g/cm$^3$, an Mw/Mn of 4.7, a melting point of 115.1° C. and a degree of branching of 15.5 (pcs./1000C). Catalytic activity was 82,000 g.copolymer/g.Zr.

Example 18

(1) Preparation of Catalyst Component

Into a three-necked 300 ml flask were placed 43 ml of purified toluene, then 1.2 g of tetrachlorozirconium (ZrCl$_4$) and 7.5 ml of indene sodium salt (2 mols/l THF solution), and stirring was conducted at room temperature for 30 minutes. Then, into the resulting solution was added a separately-prepared mixed solution consisting of 15 ml of an EtMgBr solution in THF (2 mols/l THF) and 40 ml toluene, at room temperature over a period of 30 minutes, and stirring was further conducted for 1 hour to obtain a catalyst component C as a solution. All of these operations were carried out in a nitrogen atmosphere.

(2) Vapor Phase Polymerization

A vapor phase polymerization was conducted in the same way as in Example 16 except that in place of the catalyst component A there was used the catalyst component C in an amount of 1.4 mg as zirconium atom, provided the amount of MAO was changed so as to give an Al/Zr ratio of 1,000.

Thereafter, surplus, mixed gas was discharged, followed by cooling, and the contents were withdrawn to afford 77 g of a white polymer. The ethylene/butene-1 copolymer thus prepared had an MI of 100, a density of 0.9218 g/cm$^3$, an Mw/Mn of 3.6, a melting point of 114.4° C. and a degree of branching of 22 (pcs./1000C). Catalytic activity was 59,000 g.copolymer/g.Zr.

Example 19

(1) Preparation of Tetrabenzylzirconium 5 g of zirconium tetrachloride was reacted with 12.9 g of benzyl magnesium chloride in ether. Stirring was made at 20° C. for 2 hours and thereafter at room temperature for 1 hour. Magnesium chloride precipitated in the reaction was filtered off, leaving a yellow ether solution, to obtain a tetrabenzylzirconium ether solution. In 100 ml of this solution there was contained 5.1 g of tetrabenzylzirconium.

(2) Preparation of Catalyst Component

Into a three-necked 300 ml flask were placed 43 ml of purified toluene, then the above ether solution in an amount corresponding to 2.3 g of tetrabenzylzirconium (ZrBz$_4$) and 7.5 ml of indene lithium salt (2 mols/l THF solution), and stirring was conducted at room temperature for 30 minutes. Then, into the resulting solution was added a separately-prepared mixed solution consisting of 15 ml of an EtMgBr solution in THF (2 mols/l THF) and 40 ml toluene, at room temperature over a period of 30 minutes, and stirring was further conducted for 1 hour to prepare a catalyst component D as a solution. All of these operations were carried out in a nitrogen atmosphere.

(3) Vapor Phase Polymerization

A vapor phase polymerization was performed in the same way as in Example 16 except that the catalyst component A was substituted by the catalyst component D in an amount of 1.6 mg as zirconium atom, provided the amount of MAO was changed so as to give an Al/Zr ratio of 1,000.

Thereafter, surplus mixed gas was discharged, followed by cooling, and the contents were withdrawn to afford 90 g of a white polymer. The ethylene/butene-1 copolymer thus prepared had an MI of 0.4, a density of 0.9210 g/cm$^3$, an Mw/Mn of 5.0 and a melting point of 11.4° C. Catalytic activity was 60,000 g.copolymer/g.Zr.

Example 20

(1) Preparation of Bisendenylethane Sodium Salt

Into a three-necked 100 ml flask were placed 50 ml of THF, then 46 g of bisendenylethane and 4 g of metal sodium, and reaction was allowed to take place at reflux for 4 hours. Thereafter, unreacted sodium was removed to prepare a solution containing 2 mols/l THF of bisindenyl sodium salt.

(2) Preparation of Catalyst Component

Into a three-necked 300 ml flask were placed 43 ml of purified toluene, then 1.6 g of Zr(OPr)$_4$ and 5 ml of bisindenylethane sodium salt (2 mols/l THF solution), and stirring was conducted at room temperature for 30 minutes. Then, into the resulting solution was added a separately-prepared mixed solution consisting of 25 ml of a trimethylaluminum solution in toluene (2 mols/l THF) and 30 ml toluene, at room temperature over a period of 30 minutes, and stirring was further conducted for 1 hour to prepare a catalyst component as a solution. All of these operations were carried out in a nitrogen atmosphere.

(3) Vapor Phase Polymerization

A vapor phase polymerization was performed in the same way as in Example 16 except that the catalyst component A was substituted by the catalyst component E in an amount of 1.1 mg as zirconium catalyst, provided the amount of MAO was changed so as to give an Al/Zr ratio of 100.

Thereafter, surplus mixed gas was discharged, followed by cooling, and the contents were withdrawn to afford 100 g of a white polymer. The ethylene/butene-1 copolymer thus prepared had an MI of 0.7, a density of 0.9198 g/cm$^3$, an Mw/Mn of 15.8, a melting point of 113.8° C. and a degree of branching of 18 (pcs./1000C). Catalytic activity was 29,000 g.copolymer/g.Zr.

Example 21

(1) Preparation of Catalyst Component

Into a three-necked 300 ml flask were placed 43 ml of toluene, then 1.6 g Zr(OPr)$_4$ and 4.9 ml of indenyltrimethylsilane sodium salt (2 mols/l THF solution), and stirring was conducted at room temperature for 30 minutes. Then, into the resulting solution was added the whole amount of a separately-prepared solution of 5.6 ml triethylaluminum (TEA) in 47 ml toluene at room temperature over a period of 30 minutes, and stirring was further conducted for 1 hour to prepare a catalyst component F as a solution. All of these operations were carried out in a nitrogen atmosphere.

(2) Vapor Phase Polymerization

A vapor phase polymerization was performed in the same way as in Example 16 except that the catalyst component F was used in an amount of 1.3 mg as zirconium atom in place of the catalyst component A, provided the amount of MAO was changed so as to give an Al/Zr ratio of 1,000.

Thereafter, surplus mixed gas was discharged, followed by cooling, and the contents were withdrawn to yield 96 g of a white polymer. The ethylene/butene-1 copolymer thus prepared had an MI of 0.6, a density of 0.9215 g/cm$^3$, an Mw/Mn of 4.7 and a melting point of 114.3° C. Catalytic activity was 74,000 g.copolymer/g.Zr.

Example 22

(1) Preparation of Catalyst Component

Into a three-necked 300 ml flask were placed 34 ml of purified toluene, then 1.2 g of ZrCl$_4$ and 5.2 ml of indenyl sodium salt (2 mols/l THF solution), and sirring was conducted at room temperature for 30 minutes. Then, into the solution thus prepared was added 10 ml of a separately-prepared methyllithium solution in ether (2 mols/l) at room temperature over a period of 30 minutes, and stirring was further conducted for 1 hour to obtain a catalyst component G as a solution. All of these operations were carried out in a nitrogen atmosphere.

(2) Vapor Phase Polymerization

A vapor phase polymerization was conducted in the same way as in Example 16 except that the catalyst component G was used in an amount of 1.4 mg as zirconium in place of the catalyst component A, provided the amount of MAO was changed so as to give an Al/Zr ratio of 1,000.

Thereafter, surplus mixed gas was discharged, followed by cooling, and the contents were withdrawn to yield 84 g of a white polymer. The ethylene/butene-1 copolymer thus prepared had an MI of 98, a density of 0.9169 g/cm$^3$, an Mw/Mn of 3.6 and a melting point of 113.4° C. Catalytic activity was 60,000 g.copolymer/g.Zr.

Example 23

(1) Preparation of Catalyst Component

Into a three-necked 300 ml flask were charged 43 ml of purified toluene, then 1.9 g of tetrabutoxyzirconium and 5 ml of indenyl sodium salt (2 mols/l THF solution) at room temperature over a period of 30 minutes. Then, into the resulting solution was added 25 ml of a separately-prepared butyllithium solution in ether (2 mols/l) at room temperature over a period of 30 minutes, and stirring was further conducted for 1 hour to prepare a catalyst component H as a solution. All of these operations were carried out in a nitrogen atmosphere.

(2) Vapor Phase Polymerization

A vapor phase polymerization was conducted in the same way as in Example 16 except that the catalyst component A was substituted by the catalyst component H in an amount of 1.3 mg as zirconium atom, provided the amount of MAO was changed so as to give an Al/Zr ratio of 1,000.

Thereafter, surplus mixed gas discharged, followed by cooling, and the contents were withdrawn to afford 90 g of a white polymer. The ethylene/butene-1 copolymer thus prepared had an MI of 0.9, a density of 0.9219 g/cm$^3$, an Mw/Mn of 4.6 and a melting point of 114.6° C. Catalytic activity was 69,000 g.copolymer/g.Zr.

Example 24

(1) Preparation of Catalyst Component

Into a three-necked 300 ml flask were charged 43 ml of purified toluene, then 1.6 g of Zr(OPr)$_4$ and 10 ml of indenyltrimethylsilane sodium salt (2 mols/l THF solution), and stirring was conducted at room temperature for 30 minutes. Then, into the resulting solution was added 47 ml of a separately-prepared solution of 6 ml diethylaluminum ethoxde in 47 ml toluene at room temperature over a period of 30 minutes, and stirring was further conducted for 1 hour to prepare a catalyst component I as a solution. All of these operations were carried out in a nitrogen atmosphere.

(2) Vapor Phase Polymerization

A vapor phase polymerization was conducted in the same way as in Example 16 except that in place of the catalyst component A there was used the catalyst component I in an amount of 1.5 mg as zirconium atom, provided the amount of MAO was changed so as to give an Al/Zr ratio of 500 and the polymerization temperature was changed to 80° C.

Thereafter, surplus mixed gas was discharged, followed by cooling, and the contents were withdrawn to afford 139 g of a white polymer. The ethylene/butene-1 copolymer thus prepared had an MI of 1.2, a density of 0.9209 g/cm$^3$, an Mw/Mn of 7.6 and a melting point of 114.1° C. Catalytic activity was 41,000 g.copolymer/g.Zr.

Example 25

(1) Vapor Phase Polymerization

A stainless steel 3-liter autoclave equipped with a stirrer was purged with nitrogen and charged with 200 g of dried NaCl. Further added were the catalyst component A used in Example 1, in an amount of 1.2 mg as zirconium atom, and 14 ml an MAO solution (1 mmol/ml), followed by heating to 60° C. under stirring. Then, ethylene gas fed to a total pressure of 9 kgf/cm$^2$ and polymerization was started. The polymerization was continued for 2 hours while ethylene gas was fed continuously to maintain the total pressure at 9 kgf/cm$^2$.

Thereafter, surplus mixed gas was discharged, followed by cooling, and the contents were withdrawn to afford 139 g of a white polymer. The ethylene polymer thus prepared had an MI of 0.09, a density of 0.9480 g/cm$^3$, an Mw/Mn of 4.8 and a melting point of 132.1° C. Catalytic activity was 95,000 g.polymer/g.Zr.

Example 26

(1) Preparation of Catalyst Component

Into a three-necked 300 ml flask were placed 43 ml of purified toluene, then 1.6 g of Zr(OPr)$_4$ and 4.9 ml of bis(5-methyl-1-indenyl) ethane sodium salt (2 mols/l THF solution), and stirring was conducted at room temperature for 30 minutes. Then, into the resulting solution was added 47 ml of a separately-prepared solution of 2.8 ml triethylaluminum in 47 ml toluene at room temperature over a period of 30 minutes, and stirring was further conducted for 1 hour to obtain a catalyst component J as a solution. All of these operations were carried out in a nitrogen atmosphere.

(2) Vapor Phase Polymerization

A stainless steel 3-liter autoclave equipped with a stirrer was purged with nitrogen and charged with 200 g of dried NaCl. Further added were 1.7 mg of the catalyst component J in an amount of 1.7 mg as zirconium atom and 14 ml of an MAO solution (1 mmol/ml), followed by heating to 60° C. under stirring. Then, propylene gas was fed to a total pressure of 9 kgf/cm$^2$ and polymerization was started. The polymerization was continued for 2 hours while propylene gas was fed continuously to maintain the total pressure at 9 kgf/cm$^2$.

Thereafter, surplus mixed gas was discharged, followed by cooling, and the contents were withdrawn to afford 73 g of a white polymer. The propylene polymer thus prepared had an MI of 3.5, a density of 0.9010 g/cm$^3$, an Mw/Mn of 5.3 and a melting point of 139.9° C. Catalytic activity was 43,000 g.polymer/g.Zr.

Example 27

(1) Preparation of Catalyst Component

Into a three-necked 300 ml flask were placed 43 ml of purified toluene, then 1.7 g of tetrabutoxytitanium and ml of indene sodium salt (2 mols/l THF solution), and stirring was conducted at room temperature for 30 minutes. Then, into the resulting solution was added 47 ml of a separately-prepared solution of 5 ml triisobutylaluminum in 47 ml toluene at room temperature over a 30 minute period, and stirring was further conducted for 1 hour. All of these operations were carried out in a nitrogen atmosphere.

(2) Vapor Phase Polymerization

A vapor phase polymerization was performed in the same way as in Example 16 except that in place of the catalyst component A there was used the catalyst component K in an amount of 1.4 mg as titanium atom, provided the amount of MAO was changed so as to give an Al/Ti ratio of 1,000.

Thereafter, surplus mixed gas was discharged, followed by cooling, and the contents was withdrawn to afford 72 g of a white polymer. The ethylene/butene-1 copolymer thus prepared had an MI of 0.7, a density of 0.9198 g/cm$^3$, an Mw/Mn of 4.9 and a melting point of 113.8° C. Catalytic activity was 23,000 g.copolymer/g.Ti.

Example 28

(1) Preparation of Catalyst Component

Into a three-necked 300 ml flask were placed 43 ml of purified toluene, then 2.1 g tetrapropoxyhafnium and 5 ml of indene sodium salt (2 mols/l THF solution), and stirring was conducted at room temperature for 30 minutes. Then, into the resulting solution was added 47 ml of a separately-prepared solution of 1.9 ml trimethylaluminum in 47 ml toluene at room temperature over a 30 minute period, and stirring was further conducted for 1 hour to prepare a catalyst component L as a solution. All of these operations were carried out in a nitrogen atmosphere.

(2) Vapor Phase Polymerization

A vapor phase polymerization was performed in the same way as in Example 16 except that in place of the catalyst component A there was used the catalyst component L in an amount of 2.2 mg as hafnium atom, provided the amount of MAC was changed so as to give an Al/Hf ratio of 1,000.

Thereafter, surplus mixed gas was discharged, followed by cooling, and the contents were withdrawn to afford 51 g of a white polymer. The ethylene/butene-1 copolymer thus prepared had an MI of 0.09, a density of 0.9207 g/cm$^3$, an Mw/Mn of 7.3 and a melting point of 114° C. Catalytic activity was 16,000 g.copolymer/g.H$_f$.

Example 29

(1) Preparation of Catalyst Component

Into a three-necked 300 ml flask were placed 43 ml of purified toluene, then 1.6 g of tetrapropoxyzirconium (Zr(OPr)$_4$) and 5 ml of indenyl sodium salt (2 mols/l THF solution), and stirring was conducted at room temperature for 30 minutes, followed by further stirring for 1 hour, to prepare a catalyst component M as a solution. All of these operations were carried out in a nitrogen atmosphere.

(2) Vapor Phase polymerization

A vapor phase polymerization was performed in the same way as in Example 16 except that the catalyst component M was used in an amount of 2.4 mg as zirconium atom in place of the catalyst component A, provided the amount of MAO was changed so as to give an Al/Zr ratio of 1,000.

Thereafter, surplus mixed gas was discharged, followed by cooling, and the contents were withdrawn to yield 43 g of a white polymer. The ethylene/butene-1 copolymer thus prepared had an MI of 1.1, a density of 0.9224 g/cm$^3$, an Mw/Mn of 4.6 and a melting point of 11.5° C. Catalytic activity was 18,000 g.copolymer/g.Zr.

Comparative Example 14

(1) Preparation of Catalyst Component

Into a three-necked 300 ml flask were fed 100 ml of purified toluene and then 4.2 g of Zr(OPr)$_4$, and stirring was conducted at room temperature to prepare a catalyst component A'. All of the operations were carried out in a nitrogen atmosphere.

(2) Vapor Phase Polymerization

A vapor phase polymerization was performed in the same way as in Example 16 except that the catalyst component A' was used in an amount of 1.3 mg as zirconium atom in place of the catalyst component A, provided the amount of MAO was changed so as to give an Al/Zr ratio of 1,000. But there was not produced any polymer.

Comparative Example 15

(1) Preparation of Catalyst Component

Into a three-necked 300 ml flask were fed 100 ml of purified toluene and then 4.2 g of tetrabenzylzirconium, and stirring was conducted at room temperature to prepare a catalyst component B'. All of the operations were carried out in a nitrogen atmosphere.

(2) Vapor Phase Polymerization

A vapor phase polymerization was performed in the same way as in Example 16 except that the catalyst component A was substituted by the catalyst component B' in an amount of 1.5 mg as zirconium atom, provided the amount of MAO was changed so as to give an Al/Zr ratio of 1,000. But there was not produced any polymer.

Comparative Example 16

(1) Preparation of Catalyst Component

Into a three-necked 300 ml flask were fed 100 ml of purified toluene and then 4.2 g of tetrachlorozirconium, and stirring was conducted at room temperature to prepare a catalyst component C'. All of the operations were carried out in a nitrogen atmosphere.

(2) Vapor Phase Polymerization

A vapor phase polymerization was performed in the same as in Example 16 except that the catalyst component A was substituted by the catalyst component C' is an amount of 1.4 mg as zirconium atom, provided the amount of MAO was changed so as to give an Al/Zr ratio of 1,000. But there was not produced any polymer.

Comparative Example 17

(1) Preparation of Catalyst Component

Into a three-necked 300 ml flask were fed 43 ml of purified toluene and then 1.6 g of Zr(Opr)$_4$, and stirring was conducted at room temperature for 30 minutes. Then, into the resulting solution was added the whole amount of a separately-prepared solution of 2.8 ml triethylaluminum (TEA) in 47 ml toluene at room temperature over a 30 minute period, and stirring was further conducted for 1 hour to prepare a catalyst component D′. All of these operations were carried out in a nitrogen atmosphere.

(2) Vapor Phase Polymerization

A vapor phase polymerization was performed in the same way as in Example 16 except that the catalyst component A was substituted by the catalyst component D′ in an amount of 1.5 mg as zirconium atom, provided the amount of MAO was changed so as to give an Al/Zr ratio of 1,000. But there was not produced any polymer.

Comparative Example 18

(1) Preparation of Catalyst Component

Into a three-necked 300 ml flask were fed 43 ml of purified toluene and then 1.2 g of tetrabenzylzirconiu, and stirring was conducted at room temperature for 30 minutes. Then, into the resulting solution was added the whole amount of a separately-prepared solution of 2.8 ml triethylaluminum (TEA) in 47 ml toluene at room temperature over a 30 minute period, and stirring was further conducted for 1 hour to prepare a catalyst component E′ as a solution. All of these operations were carried out in a nitrogen atmosphere.

(2) Vapor Phase Polymerization

A vapor phase polymerization was performed in the same way as in Example 16 except that in place of the catalyst component A there was used the catalyst component E′ in an amount of 1.3 mg as zirconium atom, provided the amount of MAO was changed so as to give an Al/Zr ratio of 1,000.

Thereafter, surplus mixed gas was discharged, followed by cooling, and the contents were withdrawn to afford 8 g of a white polymer. The ethylene/butene-1 copolymer thus prepared had an MI of 1.3, a density of 0.9256 g/cm$^3$, an Mw/Mn of 3.1 and a melting point of 117.3° C. Catalytic activity was as low as 6,000 g.copolymer/g.Zr. The polymer was inferior inphysical properties.

Comparative Example 19

(1) Preparation of Catalyst Component

Into a three-necked 300 ml flask were fed 43 ml of toluene and then 1.2 g of tetrachlorozirconium, and stirring was conducted at room temperature for 30 minutes. Then, into the resulting solution was added the whole amount of a separately-prepared solution of 2.8 ml triethylaluminum (TEA) in 47 ml toluene at room temperature over a 30 minute period, and stirring was further conducted for 1 hour to obtain a catalyst component F′ as a solution. All of these operations were carried out in a nitrogen atmosphere.

(2) Vapor Phase Polymerization

A vapor phase polymerization was performed in the same way as in Example 16 except that in place of the catalyst component A there was used the catalyst component F′ in an amount of 1.5 mg as zirconium atom, provided the amount of MAO was changed so as to give an Al/Zr ratio of 1,000. But there was not produced any polymer.

Comparative Example 20

(1) Preparation of Catalyst Component

Into a three-necked 300 ml flask were fed 43 ml of toluene and then 1.9 g tetrabutoxyzirconium, and stirring was conducted at room temperature for 30 minutes. Then, into the resulting solution was added 25 ml of a separately-prepared butyllithium solution in ether (2 mols/l), and stirring was further conducted for 1 hour to prepare a catalyst component G′. All of these operations were carried out in a nitrogen atmosphere.

(2) Vapor Phase Polymerization

A vapor phase polymerization was performed in the same way as in Example 16 except that in place of the catalyst component A there was used the catalyst component G′ in an amount of 1.6 mg as zirconium atom, provided the amount of MAO was changed so as to give an Al/Zr ratio of 1,000. But there was not produced any polymer.

Comparative Example 21

(1) Preparation of Catalyst Component

Into a three-necked 300 ml flask were placed 43 ml of toluene and then the foregoing ether solution in an amount corresponding to 1.4 g of tetrabenzylzirconium (ZrBz$_4$), and stirring was conducted at room temperature for 30 minutes. Then, into the resulting solution was added a separately-prepared mixed solution consisting of 3 ml of a methyllithium solution in THF (2 moles/l THF) and 40 ml of toluene, at room temperature over a 30 minute period, and stirring was further conducted for 1 hour to prepare a catalyst component H′ as a solution. All of these operations were carried out in a nitrogen atmosphere.

(2) Vapor Phase Polymerization

A vapor phase polymerization was performed in the same way as in Example 16 except that in place of the catalyst component A there was used the catalyst component H′ in an amount of 1.5 mg as zirconium atom, provided the amount of MAO was changed so as to give an Al/Zr of 1,000.

Thereafter, surplus mixed gas was discharged, followed by cooling, and the contents were withdrawn to afford 12 g of a white polymer. The ethylene/butene-1 copolymer thus prepared had an MI of 1.9, a density of 0.9221 g/cm$^3$, an Mw/Mn of 3.3 and a melting point of 116.3° C. Catalytic activity was as low as 8,000 g.copolymer/g.Zr. The polymer was inferior in physical properties.

Comparative Example 22

(1) Preparation of Catalyst Component

Into a three-necked 300 ml flask were placed 43 ml of purified toluene and then 1.2 g of ZrCl$_4$, and stirring was conducted at room temperature for 30 minutes. Then, into the resulting solution was added 5 ml of a separately-prepared methyllithium solution in ether (2 mols/l) at room temperature over a 30 minute period, and stirring was further conducted for 1 hour to prepare a catalyst component I′ as a solution. All of these operations were carried out in a nitrogen atmosphere.

(2) Vapor Phase Polymerization

A vapor phase polymerization was performed in the same way as in Example 16 except that in place of the catalyst component A there was used the catalyst component I′ in an amount of 1.4 mg as zirconium atom, provided the amount of MAO was changed so as to give an A/Zr ratio of 1,000. But no polymer was produced.

Comparative Example 23

(1) Preparation of Catalyst Component

Into a three-necked 300 ml flask were placed 43 ml of toluene and then 1.6 g of Zr(OPr)$_4$, and stirring was conducted at room temperature over a 30 minute period. Then, into the resulting solution was added a separately-prepared mixed solution consisting of 10 ml of an ethylmagnesium chloride (EtMgCl) solution in THF (2 mols/l THF) and 40 ml of toluene, at room temperature over a 30 minute period, and stirring was further conducted for 1 hour to prepare a catalyst component J' as a solution. All of these operations were carried out in a nitrogen atmosphere.

(2) Vapor Phase Polymerization

A vapor phase polymerization was performed in the same manner as in Example 16 except that in place of the catalyst component A there was used the catalyst component J' in an amount of 1.6 mg as zirconium atom, provided the amount of MAO was changed so as to give an Al/Zr ratio of 1,000. But no polymer was produced.

Comparative Example 24

(1) Preparation of Catalyst Component

Into a three-necked 300 ml flask were placed 43 ml of purified toluene and then the foregoing ether solution in an amount corresponding to 1.4 g of tetrabenzylzirconium (ZrBz$_4$), and stirring was conducted at room temperature for 30 minutes. Then, into the resulting solution was added a separately-prepared mixed solution consisting of 15 ml of an ethylmagnesium (EtMgCl) solution in THF (2 mols/l THF) and 40 ml of toluene, at room temperature over a 30 minute period, and stirring was further conducted for 1 hour to prepare a catalyst component K' as a solution. All of these operations were carried out in a nitrogen atmosphere.

(2) Vapor Phase Polymerization

A vapor phase polymerization was performed in the same manner as in Example 16 except that in place of the catalyst component A there was used the catalyst component K' in an amount of 1.7 mg as zirconium atom, provided the amount MAO was changed so as to give an Al/Zr ratio of 1,000.

Thereafter, surplus mixed gas was discharged, followed by cooling, and the contents were withdrawn to yield 26 g of a white polymer. The ethylene/butene-1 copolymer thus prepared had an MI of 2.1, a density of 0.9219 g/cm$^3$, an Mw/Mn of 3.8 and a melting point of 11.9° C. Catalytic activity was 15,000 g.copolymer/g.Zr. The polymer was inferior in physical properties.

Comparative Example 25

(1) Preparation of Catalyst Component

Into a three-necked 300 ml flask were placed 43 ml of purified toluene and then 1.2 g of tetrachlorozirconium (ZrCl$_4$), and stirring was conducted at room temperature for 30 minutes. Then, into the resulting solution was added a separately-prepared mixed solution consisting of 15 ml of an ethylmagnesium chloride (EtMgCl) solution in THF (2 mols/l THF) and 40 ml of toluene, at room temperature over a 30 minute period, and stirring was further conducted for 1 hour to prepare a catalyst component L' as a solution. All of the operations were carried out in a nitrogen atmosphere.

(2) Vapor phase Polymerization

A vapor phase polymerization was performed in the same manner as in Example 16 except that in place of the catalyst component A there was used the catalyst component L' in an amount of 1.4 mg as zirconium atom, provided the amount of MAO was changed so as to give an Al/Zr ratio of 1,000. But no polymer was produced.

Comparative Example 26

(1) Preparation of Catalyst Component 3.8 mg of zirconocene dichloride (Cp$_2$ZrCl$_2$) was dissolved in 13 ml of a MAO (1 mmol/ml) solution in toluene at room temperature, followed by stirring at room temperature for 30 minutes to prepare a catalyst component. All of the operations were carried out in a nitrogen atmosphere.

(2) Vapor Phase Polymerization

Using the catalyst component Just prepared above, a vapor phase polymerization was performed in the same manner as in Example 16.

The resulting ethylene/butene-1 copolymer had an MI of 25, a density of 0.9102 g/cm$^3$, an Mw/Mn of 7.9 and a melting poing of 97.8° C. Catalytic activity was 64,000 g.copolymer/g.Zr. A degree of branching as determined by $^{13}$C-NMR was 32.4 pcs./1000C.

Example 30

(1) Preparation of Catalyst Component

Into a three-necked 300 ml flask was placed 43 ml of purified toluene. Then, 1.5 g of tripropoxymonochlorozirconium Zr(OPr)$_3$Cl and 5 ml of an indene sodium salt (2 mols/l) solution in THF, and stirring was conducted at room temperature for 30 minutes. Then, into the resulting solution was added a separately-prepared mixed solution consisting of 10 ml of an ethylmagnesium bromide (EtMgBr) solution in THF (2 mols/l THF) and 40 ml of toluene, at room temperature over a 30 minute period, and stirring was further conducted for 1 hour to prepare a catalyst component N as a solution. All of these operations were carried out in a nitrogen atmosphere.

(2) Vapor Phase Polymerization

A vapor phase polymerization was performed in the same manner as in Example 16 except that in place of the catalyst component A there was used the catalyst component N in an amount of 1.3 mg as zirconium atom, provided the amount of MAO was changed so as to give an Al/Zr ratio of 1,000.

Thereafter, surplus mixed gas was discharged, followed by cooling, and the contents were withdrawn to afford 94 g of a white polymer. The ethylene/butene-1 copolymer thus prepared had an MI of 2.3, a density of 0.9221 g/cm$^3$, an Mw/Mn of 5.1 and a melting point of 114.8° C. Catalytic activity was 72,000 g.copolymer/g.Zr.

TABLE 1

| Ex. | Cat. Lot. | Catalyst Component (1) | (2) | (3) | Molar Ratio (1):(2):(3) | Addition Amount at Polymn. Transition Modified metal Al | Al/Zr ratio | Yield g | Cat. Activity g/gMe |
|---|---|---|---|---|---|---|---|---|---|

TABLE 1-continued

| | | | | | | | | | |
|---|---|---|---|---|---|---|---|---|---|
| 16 | A | Zr(OPr)$_4$ | AlEt$_3$ | Na Indene | 1:4:2 | 1.2 mg MAO | 1,000 | 100 | 84,000 |
| 17 | B | Zr(OPr)$_4$ | EtMgBr | same | 1:4:2 | 1.5 mg MAO | 1,000 | 123 | 82,000 |
| 18 | C | ZrCl$_4$ | EtMgBr | same | 1:6:3 | 1.3 mg MAO | 1,000 | 77 | 59,000 |
| 19 | D | ZrBz$_4$ | EtMgBr | Li Indene | 1:6:3 | 1.5 mg MAO | 1,000 | 90 | 60,000 |
| 20 | E | Zr(OPr)$_4$ | AlMe$_3$ | Na Bisindenylethane | 1:10:2 | 1.1 mg MAO | 100 | 100 | 29,000 |
| 21 | F | Zr(OPr)$_4$ | AlEt$_3$ | Na Indenyl-monomethylsilane | 1:8:2 | 1.3 mg MAO | 1,000 | 96 | 74,000 |
| 22 | G | ZrCl$_4$ | MeLi | Na Indene | 1:4:2 | 1.4 mg MAO | 1,000 | 84 | 60,000 |
| 23 | H | Zr(OBu)$_4$ | BuLi | same | 1:10.4 | 1.3 mg MAO | 1,000 | 90 | 69,000 |
| 24 | I | Zr(OPr)$_4$ | AlEt$_2$(OEt) | Na Indenyl-trimethylsilane | 1:8:4 | 1.5 mg MAO | 500 | 139 | 41,000 |
| 25 | A | Zr(OPr)$_4$ | AlEt$_2$ | Na Indene | 1:4:2 | 1.3 mg MAO | 1,000 | 123 | 95,000 |
| 26 | J | Zr(OPr)$_4$ | AlEt$_2$ | Na Bis(5-methyl-1-indenyl)ethane | 1:4:2 | 1.7 mg MAO | 1,000 | 73 | 43,000 |
| 27 | K | Ti(OBu)$_4$ | AliBu$_2$ | Na Indene | 1:4:2 | 1.4 mg MAO | 1,000 | 72 | 52,000 |
| 28 | L | Hf(OPr)$_4$ | AlMe$_3$ | same | 1:4:2 | 2.2 mg MAO | 1,000 | 51 | 23,000 |
| 29 | M | Zr(OPr)$_4$ | — | same | 1:4:2 | 2.4 mg MAO | 1,000 | 43 | 18,000 |

| Ex. | Mw/Mn | MFR g/10 min | Density g/cm$^3$ | m.p. °C. |
|---|---|---|---|---|
| 16 | 4.8 | 0.9 | 0.9217 | 114.3 |
| 17 | 4.7 | 0.7 | 0.9231 | 115.0 |
| 18 | 3.6 | 100 | 0.9218 | 114.4 |
| 19 | 5.0 | 0.4 | 0.9210 | 114.0 |
| 20 | 15.8 | 0.7 | 0.9198 | 113.8 |
| 21 | 4.7 | 0.6 | 0.9215 | 114.3 |
| 22 | 3.6 | 98 | 0.9169 | 113.4 |
| 23 | 4.6 | 0.9 | 0.9219 | 114.6 |
| 24 | 7.6 | 1.2 | 0.9209 | 114.1 |
| 25 | 4.8 | 0.09 | 0.9480 | 132.1 |
| 26 | 5.3 | 3.5 | 0.9010 | 139.9 |
| 27 | 4.9 | 0.7 | 0.9198 | 113.8 |
| 28 | 7.3 | 0.09 | 0.9207 | 114.0 |
| 29 | 4.6 | 1.1 | 0.9224 | 114.5 |

TABLE 2

| Com. Ex. | Cat. Lot. | Catalyst Component (1) | (2) | (3) | Molar Ratio (1):(2):(3) | Addition Amount at Polymn. Transition Modified metal Al | Al/Zr ratio | Yield g | Cat. Activity g/gMe | Mw/Mn | MFR g/10 min | Density g/cm$^3$ | m.p. °C. |
|---|---|---|---|---|---|---|---|---|---|---|---|---|---|
| 14 | A' | Zr(OPr)$_4$ | — | — | 1:0:0 | 1.3 mg MAO | 1,000 | 0 | — | — | — | — | — |
| 15 | B' | ZrBz$_4$ | — | — | 1:0:0 | 1.5 mg MAO | 1,000 | 0 | — | — | — | — | — |
| 16 | C' | ZrCl$_4$ | — | — | 1:0:0 | 1.4 mg MAO | 1,000 | 0 | — | — | — | — | — |
| 17 | D' | Zr(OPr)$_4$ | AlEt$_3$ | — | 1:4:0 | 1.5 mg MAO | 1,000 | 0 | — | — | — | — | — |
| 18 | E' | ZrBz$_4$ | AlEt$_3$ | — | 1:4:0 | 1.3 mg MAO | 1,000 | 8 | 6,000 | 3.1 | 1.3 | 0.9256 | 117.3 |
| 19 | F' | ZrCl$_4$ | AlEt$_3$ | — | 1:4:0 | 1.5 mg MAO | 1,000 | 0 | — | — | — | — | — |
| 20 | G' | Zr(OBu)$_4$ | BuLi | — | 1:10:0 | 1.6 mg MAO | 1,000 | 0 | — | — | — | — | — |
| 21 | H' | ZrBz$_4$ | MeLi | — | 1:6:0 | 1.5 mg MAO | 1,000 | 12 | 8,000 | 3.3 | 1.9 | 0.9221 | 116.3 |
| 22 | I' | ZrCl$_4$ | MeLi | — | 1:4:0 | 1.4 mg MAO | 1,000 | 0 | — | — | — | — | — |
| 23 | J' | Zr(OPr)$_4$ | EtMgCl | — | 1:4:0 | 1.6 mg MAO | 1,000 | 0 | — | — | — | — | — |
| 24 | K' | ZrBz$_4$ | EtMgCl | — | 1:6:0 | 1.7 mg MAO | 1,000 | 26 | 15,000 | 3.8 | 2.1 | 0.9219 | 114.9 |
| 25 | L' | ZrCl$_4$ | EtMgCl | — | 1:6:0 | 1.4 mg MAO | 1,000 | 0 | — | — | — | — | — |

What is claimed is:

1. A process for preparing a polyolefin, characterized by polymerizing at least one olefin in the presence of a catalyst comprising the following components a) and b):
   a) a catalyst component obtained by mutually contacting:
      (1) a compound represented by the general formula Me$^1$R$^1_n$X$^1_{4-n}$ wherein R$^1$ is a hydrocarbon residue having 1 to 24 carbon atoms, X$^1$ is a halogen atom, Me is Zr, Ti or Hf, and n is in the range of $0 \leq n \leq 4$, and
      (2) an alkali metal salt of a member selected from the group consisting of cyclopentadienes and indenes, and optionally
      (3) a compound represented by the general formula Me$^2$R$^2_m$X$^2_{z-m}$ wherein R$^2$ is a hydrocarbon group having 1 to 24 carbon atoms, X$^2$ is an alkoxy group having 1 to 12 carbon atoms or a halogen atom, Me$^2$ is an element from Groups I to III of the Periodic Table, z is the valence of Me$^2$ and m is in the range of $0 < m \leq 3$;
   b) a modified organoaluminum compound prepared by the reaction of an organoaluminum compound and water and containing Al—O—Al bond(s).

2. A process according to claim 1, wherein said cyclopentadienes comprise cyclopentadiene, substituted cyclopentadienes substituted with a hydrocarbon group, and silicon compounds containing said cyclopentadiene and/or substituted cyclopentadienes.

3. A process according to claim 1, wherein said indenes comprise indene, substituted indenes substituted with a hydrocarbon group, and silicon compounds containing said indene and/or substituted indenes.

4. A process according to claim 1, wherein the proportion of the component (2) is in the range of 0.01 to 100 mols per mol of the component (1).

5. A process according to claim 1, wherein the proportion of the component (2) and that of the component (3) are each in the range of 0.01 to 100 mols, per mol of the component (1).

6. A process according to claim 5, wherein $Me^2$ in the component (3) is lithium, sodium, potassium, magnesium, calcium, zinc, boron, or aluminum.

7. A process according to claim 1, wherein the modified organoaluminum compound is the reaction product of an organoaluminum compound represented by the general formula $R_nAlX_{3-n}$ and water, in which formula R is a hydrocarbon group having 1 to 18 carbon atoms, X is hydrogen or a halogen atom, and n is an integer in the range $1 \leq n \leq 3$, and the modified organoaluminum compound contains 1 to 100 Al—O—Al bonds in the molecule.

8. A process according to claim 1, wherein an atomic ratio of the modified organoaluminium compound to the transition metal in the catalyst component is in the range of 1 to 100,000.

9. A process according to claim 1 wherein $Me^1$ is Zr or Hf.

10. A process according to claim 1 wherein the alkali metal salt is a cyclopentadiene.

11. A process according to claim 1 wherein the alkali metal salt is an indene.

* * * * *